(12) United States Patent
Wood et al.

(10) Patent No.: US 11,186,409 B2
(45) Date of Patent: *Nov. 30, 2021

(54) RECONFIGURABLE PALLET/DOLLY PLATFORM

(71) Applicant: CHEP Technology Pty Limited, Sydney (AU)

(72) Inventors: Matthew Wood, Davenport, FL (US); Paul Barnswell, Debary, FL (US); Bradley Wayne Daubenspeck, Windermere, FL (US); Craig Rolland Norman, Cumming, GA (US)

(73) Assignee: CHEP Technology Pty Limited, Sydney (AU)

(*) Notice: Subject to any disclaimer, the term of this patent is extended or adjusted under 35 U.S.C. 154(b) by 0 days.

This patent is subject to a terminal disclaimer.

(21) Appl. No.: 16/688,378

(22) Filed: Nov. 19, 2019

(65) Prior Publication Data

US 2020/0079550 A1    Mar. 12, 2020

Related U.S. Application Data

(63) Continuation of application No. 16/100,373, filed on Aug. 10, 2018, now Pat. No. 10,494,141.

(Continued)

(51) Int. Cl.
*B65D 19/00*    (2006.01)
*B65D 19/44*    (2006.01)
(Continued)

(52) U.S. Cl.
CPC ........ *B65D 19/0018* (2013.01); *B62B 5/0093* (2013.01); *B65D 19/0026* (2013.01);
(Continued)

(58) Field of Classification Search
CPC ............ B65D 19/0018; B65D 19/0026; B65D 19/385; B65D 19/02; B65D 19/38;
(Continued)

(56) References Cited

U.S. PATENT DOCUMENTS 3,298,327 A    1/1967   Grimes
3,523,507 A    8/1970   Dubin
(Continued)

FOREIGN PATENT DOCUMENTS

CA    2 461 554    4/2003
CA    2512817      7/2004
(Continued)

*Primary Examiner* — Daniel J Rohrhoff
(74) *Attorney, Agent, or Firm* — Allen, Dyer, Doppelt + Gilchrist, PA

(57) ABSTRACT

A reconfigurable pallet/dolly platform includes a top deck that includes a product support surface and an opposing underside. The underside includes pallet support leg attachment areas for receiving pallet support legs when configured as a pallet, and dolly wheel attachment areas for receiving dolly wheels when configured as a dolly. The product support surface includes pallet support leg receiving areas aligned with the pallet support leg attachment areas and configured to engage the pallet support legs from an identical platform stacked thereon when configured as a pallet. The product support surface also includes dolly wheel receiving areas aligned with the dolly wheel wells and configured to engage the dolly wheels from an identical platform stacked thereon when configured as a dolly. Each dolly wheel receiving area partially overlaps with one of the pallet support leg receiving areas.

20 Claims, 20 Drawing Sheets

Related U.S. Application Data

(60) Provisional application No. 62/641,507, filed on Mar. 12, 2018, provisional application No. 62/546,217, filed on Aug. 16, 2017.

(51) Int. Cl.
  *B62B 5/00* (2006.01)
  *B65D 19/38* (2006.01)
  *B65D 19/42* (2006.01)
  *B62B 3/14* (2006.01)
  *B62B 3/16* (2006.01)
  *B62B 3/02* (2006.01)

(52) U.S. Cl.
  CPC .......... *B65D 19/385* (2013.01); *B65D 19/42* (2013.01); *B65D 19/44* (2013.01); *B62B 3/02* (2013.01); *B62B 3/1408* (2013.01); *B62B 3/1476* (2013.01); *B62B 3/16* (2013.01); *B62B 2205/10* (2013.01); *B62B 2205/104* (2013.01); *B62B 2206/006* (2013.01); *B62B 2501/065* (2013.01); *B65D 2519/00034* (2013.01); *B65D 2519/00069* (2013.01); *B65D 2519/0096* (2013.01); *B65D 2519/0099* (2013.01); *B65D 2519/00129* (2013.01); *B65D 2519/00268* (2013.01); *B65D 2519/00273* (2013.01); *B65D 2519/00288* (2013.01); *B65D 2519/00323* (2013.01); *B65D 2519/00333* (2013.01); *B65D 2519/00402* (2013.01); *B65D 2519/00407* (2013.01); *B65D 2519/00412* (2013.01); *B65D 2519/00437* (2013.01); *B65D 2519/00442* (2013.01); *B65D 2519/00567* (2013.01); *B65D 2519/00771* (2013.01); *B65D 2519/00781* (2013.01); *B65D 2519/00791* (2013.01); *B65D 2519/00796* (2013.01); *B65D 2519/00815* (2013.01); *B65D 2519/00955* (2013.01)

(58) Field of Classification Search
  CPC .................. B65D 19/40; B65D 19/42; B65D 2519/00781; B65D 3/02
  See application file for complete search history.

(56) References Cited

U.S. PATENT DOCUMENTS

| | | |
|---|---|---|
| 3,524,415 A | 8/1970 | Heiman |
| 3,675,595 A | 7/1972 | Sullivan |
| 3,680,495 A | 8/1972 | Pike |
| 3,756,167 A | 9/1973 | Wilson |
| 3,994,241 A | 11/1976 | Evans |
| 4,051,787 A | 10/1977 | Nishitani et al. |
| RE32,344 E | 2/1987 | Wind |
| 5,016,761 A | 5/1991 | Stoddard et al. |
| 5,197,396 A | 3/1993 | Breezer et al. |
| 5,445,396 A | 8/1995 | Sebor |
| 5,606,921 A | 3/1997 | Elder et al. |
| 5,791,262 A | 8/1998 | Knight et al. |
| 5,860,369 A | 1/1999 | John et al. |
| 6,101,955 A | 8/2000 | Salce |
| 6,135,031 A | 10/2000 | Heil |
| 6,164,214 A | 12/2000 | Smorgon et al. |
| 6,257,152 B1 | 7/2001 | Liu |
| 6,357,366 B1 | 3/2002 | Frankenberg |
| 6,508,182 B1 | 1/2003 | Smorgan et al. |
| 6,509,084 B2 | 1/2003 | Sturtevant et al. |
| 6,857,377 B2 | 2/2005 | Herring et al. |
| 6,895,868 B1 | 5/2005 | Cronk et al. |
| 6,905,021 B2 | 6/2005 | Polumbaum et al. |
| 6,976,436 B1 | 12/2005 | Sugihara et al. |
| 6,979,005 B1 | 12/2005 | McLerran |
| 7,644,666 B2 | 1/2010 | Smyers |
| 7,819,068 B2 | 10/2010 | Apps et al. |
| 7,856,932 B2 | 12/2010 | Stahl et al. |
| 7,963,235 B2 | 6/2011 | Muirhead |
| 8,424,469 B2 | 4/2013 | Shuert |
| 8,511,239 B2 | 8/2013 | Lin |
| 8,740,228 B2 | 6/2014 | Patterson et al. |
| 9,061,693 B2 | 6/2015 | Hassell |
| 9,290,298 B2 | 3/2016 | Linares |
| 9,376,234 B2 | 6/2016 | Linares |
| 9,387,953 B2 | 7/2016 | Takyar et al. |
| 9,745,099 B2 | 8/2017 | Takyar et al. |
| 10,494,141 B2 * | 12/2019 | Wood .................. B65D 19/385 |
| 2003/0205877 A1 | 11/2003 | Verna et al. |
| 2003/0209171 A1 | 11/2003 | Milles |
| 2004/0134390 A1 | 7/2004 | Apps et al. |
| 2005/0145144 A1 | 7/2005 | Gab |
| 2005/0211139 A1 | 9/2005 | Perrotta et al. |
| 2007/0186827 A1 * | 8/2007 | Loftus .................. B65D 19/42 |
| | | 108/57.15 |
| 2009/0053033 A1 | 2/2009 | Barbalho et al. |
| 2009/0236809 A1 * | 9/2009 | Carver .................. B62B 5/0093 |
| | | 280/43.12 |
| 2010/0187782 A1 * | 7/2010 | Facey .................. B62B 5/0093 |
| | | 280/30 |
| 2010/0300332 A1 | 12/2010 | Hayman |
| 2011/0179978 A1 | 7/2011 | Schmitt |
| 2012/0048154 A1 | 3/2012 | Toomer et al. |
| 2012/0049472 A1 | 3/2012 | Patterson et al. |
| 2013/0032507 A1 | 2/2013 | Du Toit et al. |
| 2013/0119623 A1 * | 5/2013 | Sadeh ................ B65D 19/0026 |
| | | 280/30 |
| 2013/0119624 A1 * | 5/2013 | Stubbs ...................... B62B 3/02 |
| | | 280/30 |
| 2013/0121800 A1 * | 5/2013 | Hacko ................ B65D 19/0026 |
| | | 414/800 |
| 2013/0154218 A1 | 6/2013 | Tiilikainen |
| 2013/0220184 A1 | 8/2013 | Apps et al. |
| 2014/0283713 A1 * | 9/2014 | Baltz ...................... B65D 19/44 |
| | | 108/50.11 |
| 2015/0135999 A1 | 5/2015 | Takyar et al. |
| 2015/0203138 A1 * | 7/2015 | Hassell .................. B62B 3/008 |
| | | 280/47.34 |
| 2016/0167831 A1 | 6/2016 | Suiter et al. |
| 2017/0036810 A1 | 2/2017 | Burk |
| 2017/0081075 A1 | 3/2017 | Bruce et al. |
| 2017/0297765 A1 | 10/2017 | Guerry et al. |
| 2017/0320620 A1 | 11/2017 | Takyar et al. |
| 2019/0055055 A1 | 2/2019 | Wood et al. |

FOREIGN PATENT DOCUMENTS

| | | |
|---|---|---|
| CA | 2 580 244 | 9/2007 |
| CA | 2 648 789 | 7/2009 |
| CA | 2 750 311 | 2/2012 |
| CA | 2 940 781 | 3/2017 |
| CA | 2 958 971 | 8/2017 |
| CL | 45291 | 1/2006 |
| CN | 1072147 | 5/1993 |
| DE | 202015100355 | 1/2015 |
| EP | 2 878 548 | 6/2001 |
| EP | 2 487 117 | 8/2012 |
| EP | 1419973 | 5/2014 |
| EP | 2 878 549 | 6/2015 |
| EP | 2 878 550 | 6/2015 |
| WO | WO2017130167 | 8/2017 |

* cited by examiner

RECONFIGURABLE PALLET/DOLLY PLATFORM

RELATED APPLICATION

This application is a continuation of U.S. application Ser. No. 16/100,373 filed Aug. 10, 2018, which claims the benefit of U.S. Provisional Application Ser. No. 62/546,217 filed Aug. 16, 2017 and U.S. Provisional Application Ser. No. 62/641,507 filed Mar. 12, 2018, the entire contents of which are incorporated herein by reference.

TECHNICAL FIELD

The present disclosure relates to the field of product platforms, and more particularly, to a platform that can be configured as a pallet or dolly for moving products.

BACKGROUND

Retail stores often prefer the use of fractional pallets when displaying products thereon that are for customer purchase. A fractional pallet is typically one-quarter to one-half the size of a full size pallet. Fractional pallets have a significantly smaller footprint than full size pallets, which allows the retail stores to display a greater variety of products within the same size area as a conventional pallet.

In addition, retail stores often prefer the use of fractional plastic pallets instead of fractional wood pallets. Fractional plastic pallets are more aesthetically pleasing than fractional wood pallets, as well as being more sanitary.

As an alternative to fractional plastic pallets, plastic dollies may also be used for moving products. A dolly typically includes a deck supported by casters that can swivel about an axis perpendicular to the deck.

SUMMARY

A reconfigurable pallet/dolly platform includes a top deck that includes a product support surface and an opposing underside. The underside includes a pair of pallet support leg attachment areas for receiving a pair of pallet support legs when configured as a pallet, and a plurality of dolly wheel attachment areas for receiving a plurality of dolly wheels when configured as a dolly. The product support surface includes a pair of pallet support leg receiving areas aligned with the pair of pallet support leg attachment areas and configured to engage the pair of pallet support legs from an identical platform stacked thereon when configured as a pallet. The product support surface also includes a plurality of dolly wheel receiving areas aligned with the plurality of dolly wheel attachment areas and configured to engage the plurality of dolly wheels from an identical platform stacked thereon when configured as a dolly. Each dolly wheel receiving area partially overlaps with one of the pallet support leg receiving areas.

Each pallet support leg receiving area may be rectangular shaped, and wherein each dolly wheel receiving area may overlap an outside corner of one of the pallet support leg receiving areas.

Each pallet support leg receiving area and each dolly wheel receiving area may be recessed from the product support surface.

Each pallet support leg receiving area may include a pattern of spaced apart protrusions matching a corresponding pattern of spaced apart protrusion openings in an underside of each pallet support leg.

Each pallet support leg may include a center leg section having a first end and a second end opposite the first end, and a pair of leg extensions extending outwards from the second end of the center leg section. The underside of the top deck may include a pair of center leg section openings, with each center leg section opening to receive the first end of one of the center leg sections when configured as a pallet.

Each center leg section opening may be separated by a divider, and wherein the first end of each center leg section is slotted to receive the divider. Each center leg section opening may include a plurality of locking tab openings for engaging a plurality of locking tabs on one of the center leg sections.

A length of each center leg section opening may be within a range of 30% to 40% of an overall length of each pallet support leg receiving area. Each pallet support leg receiving area may have a length within a range of 75% to 95% of a length of the top deck, and a width within a range of 10% to 20% of a width of the top deck.

The top deck may have a length of 24 inches and a width of 20 inches.

When the top deck is configured as a pallet, the plurality of dolly wheel attachment areas do not receive the plurality of dolly wheels. When the top deck is configured as a dolly, the pair of pallet support leg attachment areas do not receive the pair of pallet support legs.

Another aspect is directed to a method for making a reconfigurable pallet/dolly platform as described above.

DETAILED DESCRIPTION

Figure 1:
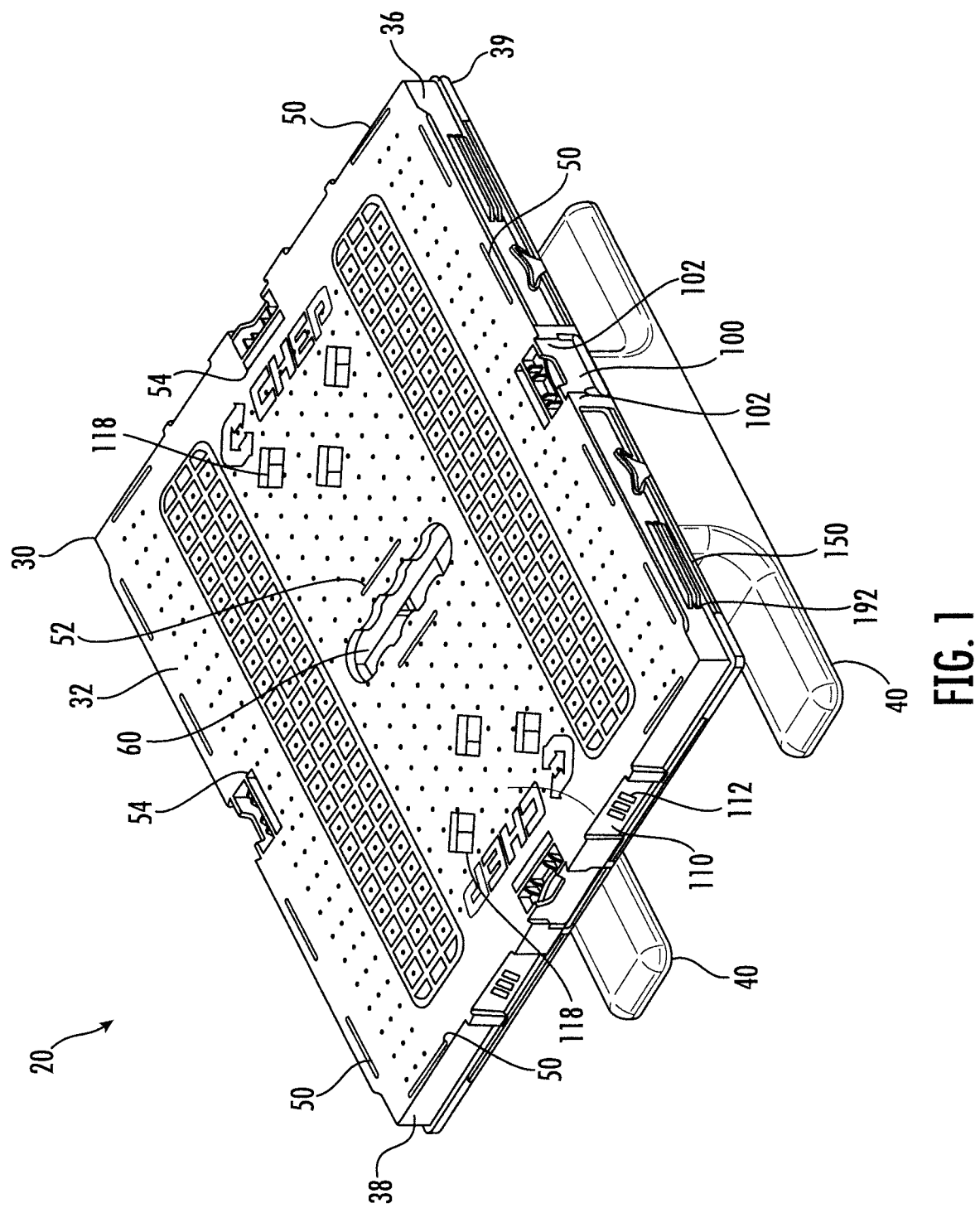
FIG. 1 is an upper perspective view of a fractional plastic pallet in accordance with the disclosure.

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout, and prime notations are used to indicate similar elements in alternative embodiments.

Referring initially to FIGS. 1-5, the illustrated fractional plastic pallet 20 includes a top deck 30, and a pair of pallet support legs 40 coupled to the top deck. The pallet support legs 40 are configured to enable 4-way entry by pallet handling equipment, such as a forklift or a pallet jack. As will be discussed in detail below, the fractional plastic pallet 20 is also reparable, stackable and includes a number of different product display attachment points.

The illustrated fractional plastic pallet 20 is also known as a quarter pallet since it is one quarter the size of a conventional full size pallet. A size of the fractional plastic pallet 20 is 24 inches by 20 inches. As readily appreciated by those skilled in the art, the dimensions of the pallet 20 may be changed to accommodate other fractional sizes, such as half-size, for example. Also, plastic used in the fractional plastic pallet 20 may be recyclable.

The top deck 30 includes a product support surface 32 and an opposing underside 34, and with outer exposed sides extending between the product support surface and the opposing underside. The outer exposed sides include spaced apart sides 36 and spaced apart sides 38. Sides 36 are parallel to the pallet support legs 40, and sides 38 are orthogonal to the pallet support legs 40.

The top deck 30 includes a number of different product display attachment points for securing a product display or box to the fractional plastic pallet 20. When the fractional plastic pallet 20 is on the floor within a store with products thereon, for example, a product display helps to promote the products. U.S. Pat. No. 9,387,953 discloses a fractional plastic pallet with product display attachment points, and is incorporated herein by reference in its entirety. The '953 patent is assigned to the current assignee of the present invention.

Figure 2:
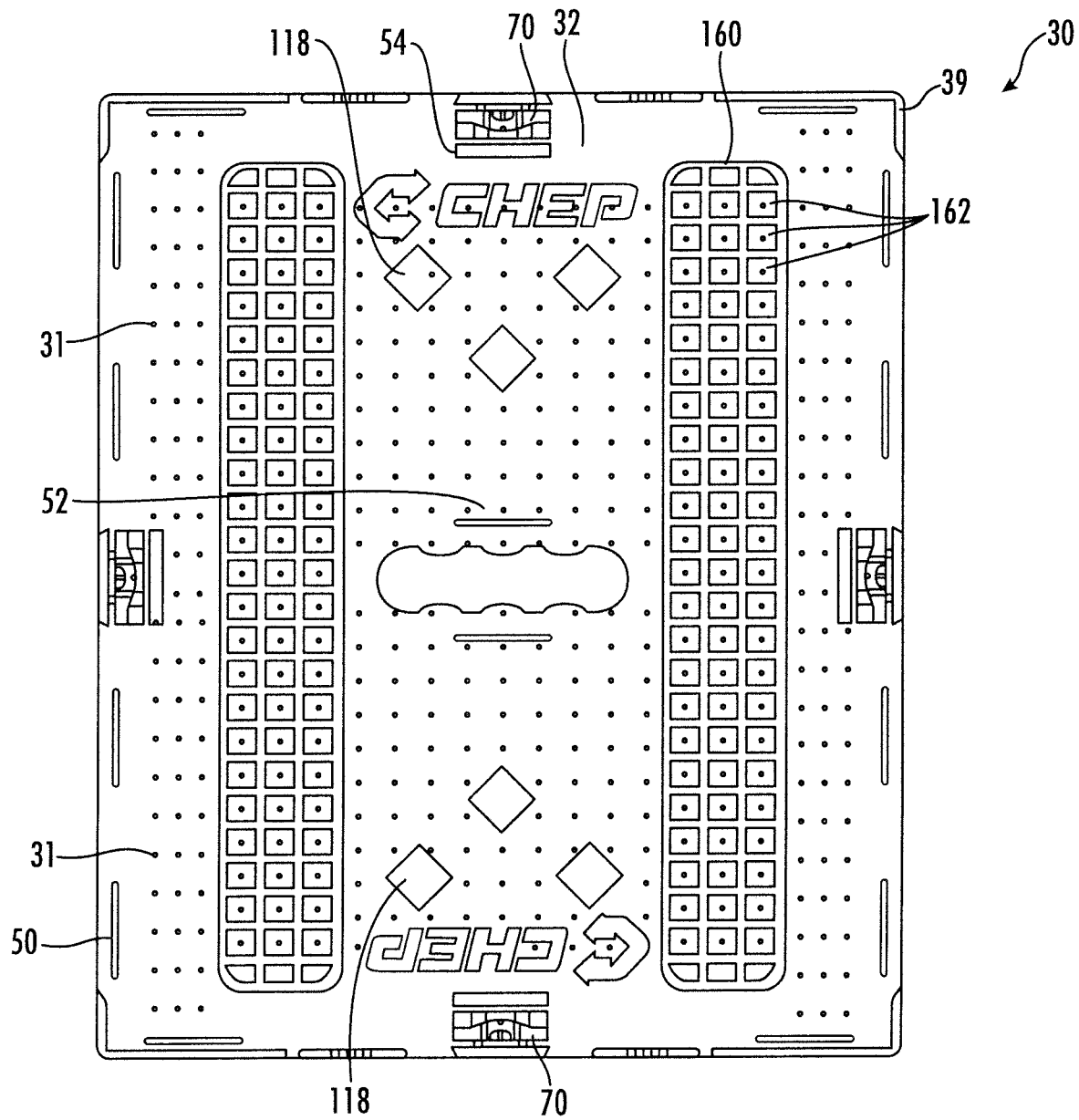
FIG. 2 is a top view of the fractional plastic pallet shown in FIG. 1.
Figure 3:
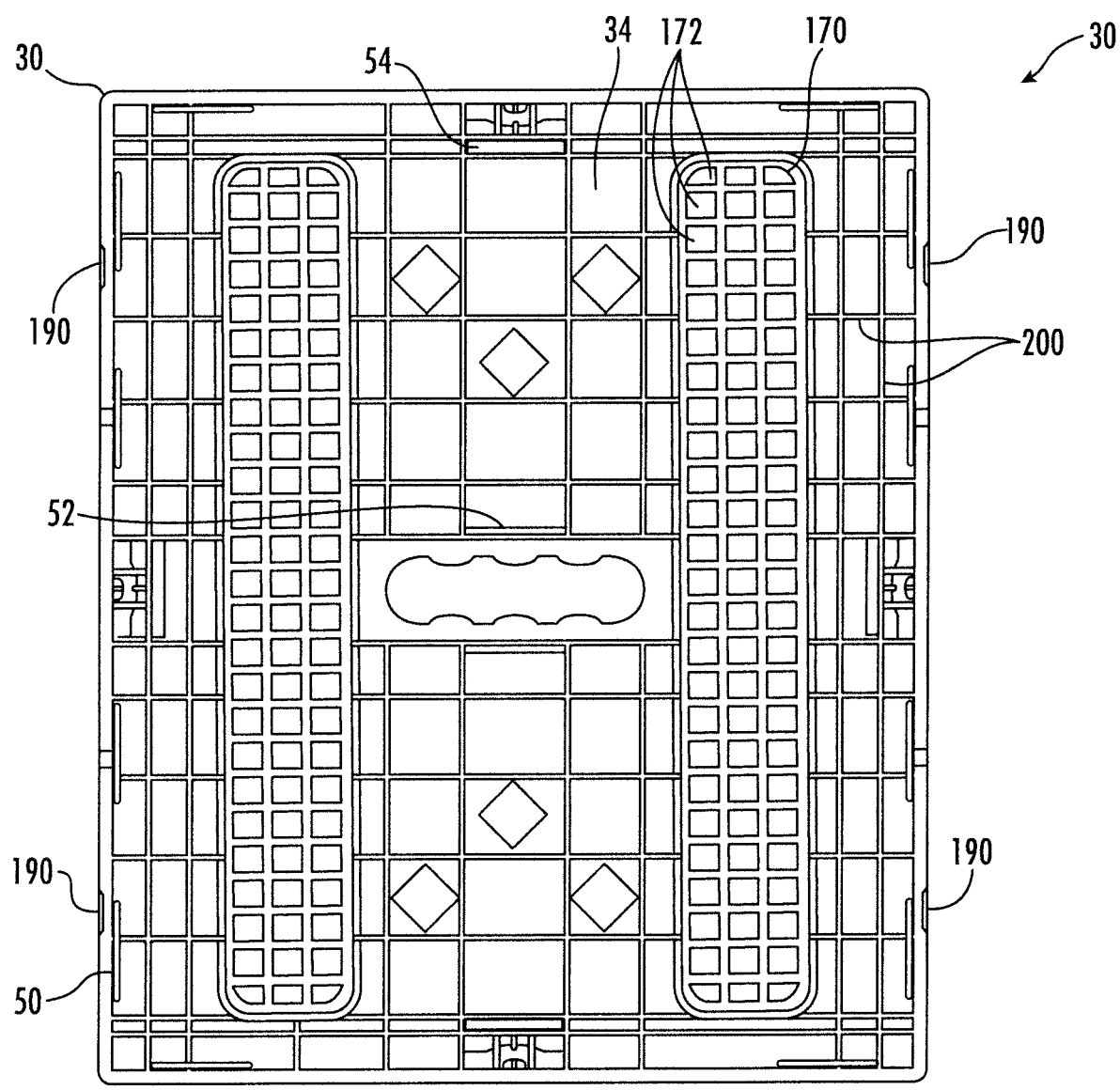
FIG. 3 is a bottom view of the fractional plastic pallet shown in FIG. 1.

Product display attachment points include display attachment slots 50, 52 and 54 in the product support surface 32, as shown in FIG. 2. Each display attachment slot 50, 52, 54 is rectangular shaped and is sized to receive a tab descending from the base of a product display so as to allow the product display to be held in place on the fractional plastic pallet 20. The display attachment slots 50, 52, 54 extend through the product support surface 32 and are visible from the opposing underside 34, as shown in FIG. 3.

Display attachment slots 50 are located adjacent the edges of the top deck 30, display attachment slots 52 are located near the center of the top deck 30, and display attachment points 54 are also located adjacent the edges of the top deck 30. Display attachment slots 52 may be provided to cooperate with display attachment slots 50. Display attachment slots 54 are provided to accommodate a different size product display to be held in place on the fractional plastic pallet 20.

Four display attachment slots 50 are adjacent each side 36, and two display attachment slots 50 are adjacent each side 38. In the center of the fractional plastic pallet 20 there are two display attachment slots 52. The two display attachment slots 52 are separated by a hand access hole 60. There is one display attachment slot 54 centered on each of the sides 36, 38 of the top deck 30.

Product display attachment points further include display attachment slots 70. Each display attachment slot 70 is adjacent the edges 36, 38 of the top deck 30, and centered between the corners of the fractional plastic pallet 20.

Figure 6:
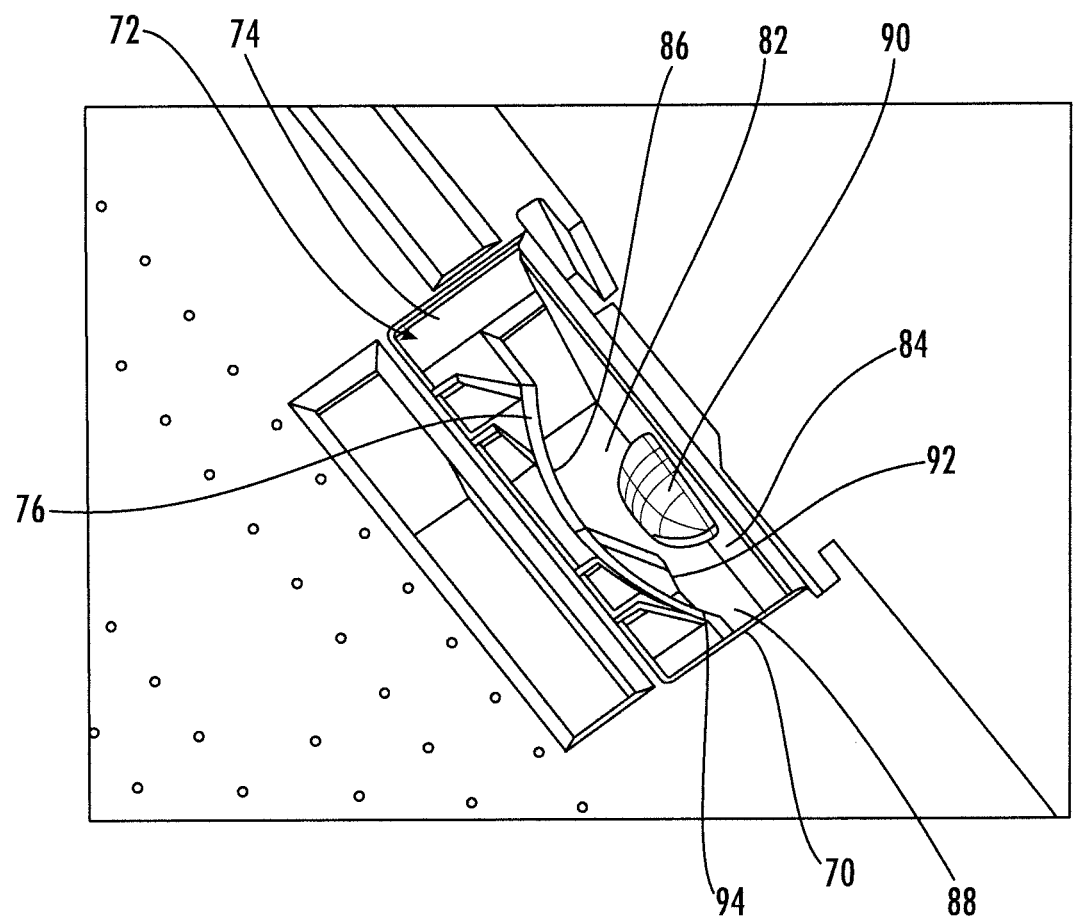
FIG. 6 is a top perspective view of one of the product display attachment points shown in FIG. 1.

Referring now to FIG. 6, each display attachment slot 70 includes an outer slot 72 within the top deck 30 and an inner slot 82 recessed within the outer slot. The outer slot 72 includes sides 74 and a partially closed bottom 76 forming a curved shelf. The inner slot 82 is adjacent the curved shelf 76 and is recessed below the outer slot 72. The inner slot 82 has a pair of spaced apart sidewalls 84 and 86, and a closed bottom 88.

Within the inner slot 82, sidewall 84 includes a projection 90 extending therefrom, and the opposing sidewall 86 includes a tapered member 92 extending therefrom. The tapered member 92 has a downwards taper towards the projection 90. If the product display tab has an appropriately positioned hole, that hole can engage and lock onto the projection 90 or the tapered member 92.

The sidewall 86 with the tapered member 92 is curved corresponding to the curved shelf 76, whereas the sidewall 84 with the projection 90 is not curved. The tapered member 92 includes a lowermost surface 94 that is perpendicular to the closed bottom 88 of the inner slot 82. There is a gap between the flat underside 94 and the closed bottom 88.

The projection 90 has a quarter-spherical shape, for example. The tapered member 92 is aligned with a center of the projection 90.

Product display attachment points further include display attachment slots 100. Each display attachment slot 100 is adjacent a respective display attachment slot 70, and is recessed from a side 36, 38 of the top deck 30.

A significant portion of the corresponding sides 36, 38 of the top deck 30 is removed so as to expose the display attachment slot 100. Removal of the corresponding sides 36, 38 is not uniform for the display attachment slots 100 so as to form a pair of spaced apart retention tabs 102 for securing a product display tab. The retention tabs 102 are at an upper portion of the display attachment slot 100, while the lower portion of the display attachment slot 100 is fully exposed.

Product display attachment points include display attachment slots 110, which are also recessed from the sides 38 of the top deck 30. However, the side 38 of the top deck 30 is removed so as to fully expose the display attachment slot 110. To hold a product display tab in place, the display attachment slot 110 includes one or more engagement teeth 112. Each engagement tooth 112 has a tapered side projecting outwards and a flat bottom.

In the illustrated embodiment, there are three engagement teeth 112 for each display attachment slot 110. There are two display attachment slots 110 for each side 38. There may be a different number of engagement teeth 112 in other embodiments of the display attachment slots 110.

Product display attachment points further include display attachment slots 118. The display attachment slots 118 are diamond shaped. There are three display attachment slots 118 on each side of the hand access hole 60. The respective display attachment slots 118 are grouped together in a triangular pattern.

As noted above, the fractional plastic pallet 20 is reparable. The pallet support legs 40 are formed separate from the top deck 30, with the top deck 30 being detachable from the pallet support legs 40 for pallet repair. Snap pins, for example, may be used to secure each pallet support leg 40 to an underside of the top deck 30. Alternatively, attachments other than snap pins may be used, as readily appreciated by those skilled in the art. If the fractional plastic pallet 20 is damaged, anyone of the pallet support legs 40 and the top deck 30 may be replaced as needed.

Each pallet support leg 40 has a center leg section 42 and a pair of leg extensions 44 extending from the center leg section 42. The center leg section 42 and the pair of leg extensions 44 are monolithically formed. The center leg section 42 is secured to the top deck 30 while the leg extensions 44 provide pallet stability.

Figure 7:
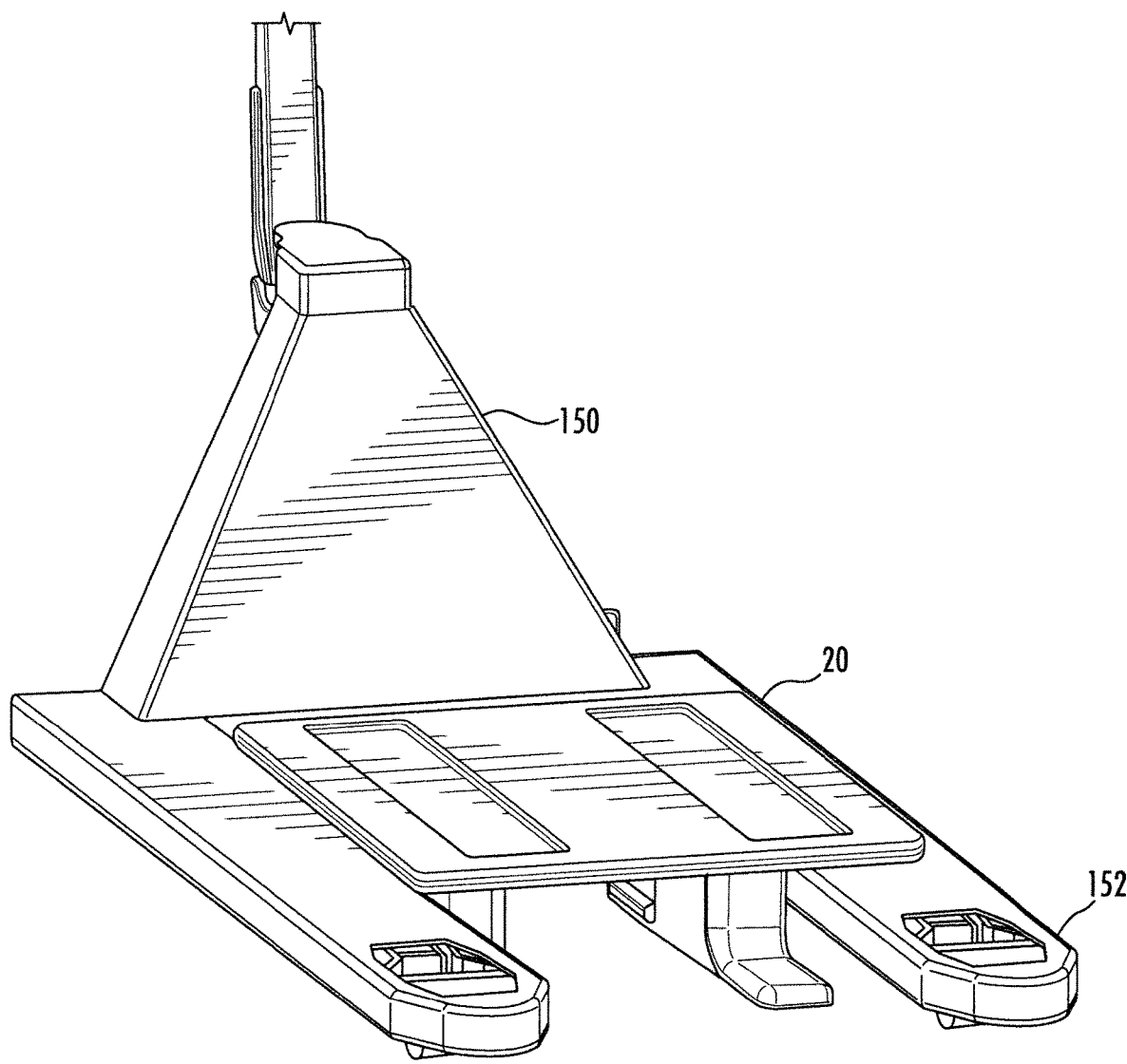
FIGS. 7 and 8 are perspective views of a pallet jack in position at different entry points on the fractional plastic pallet shown in FIG. 1.
Figure 8:
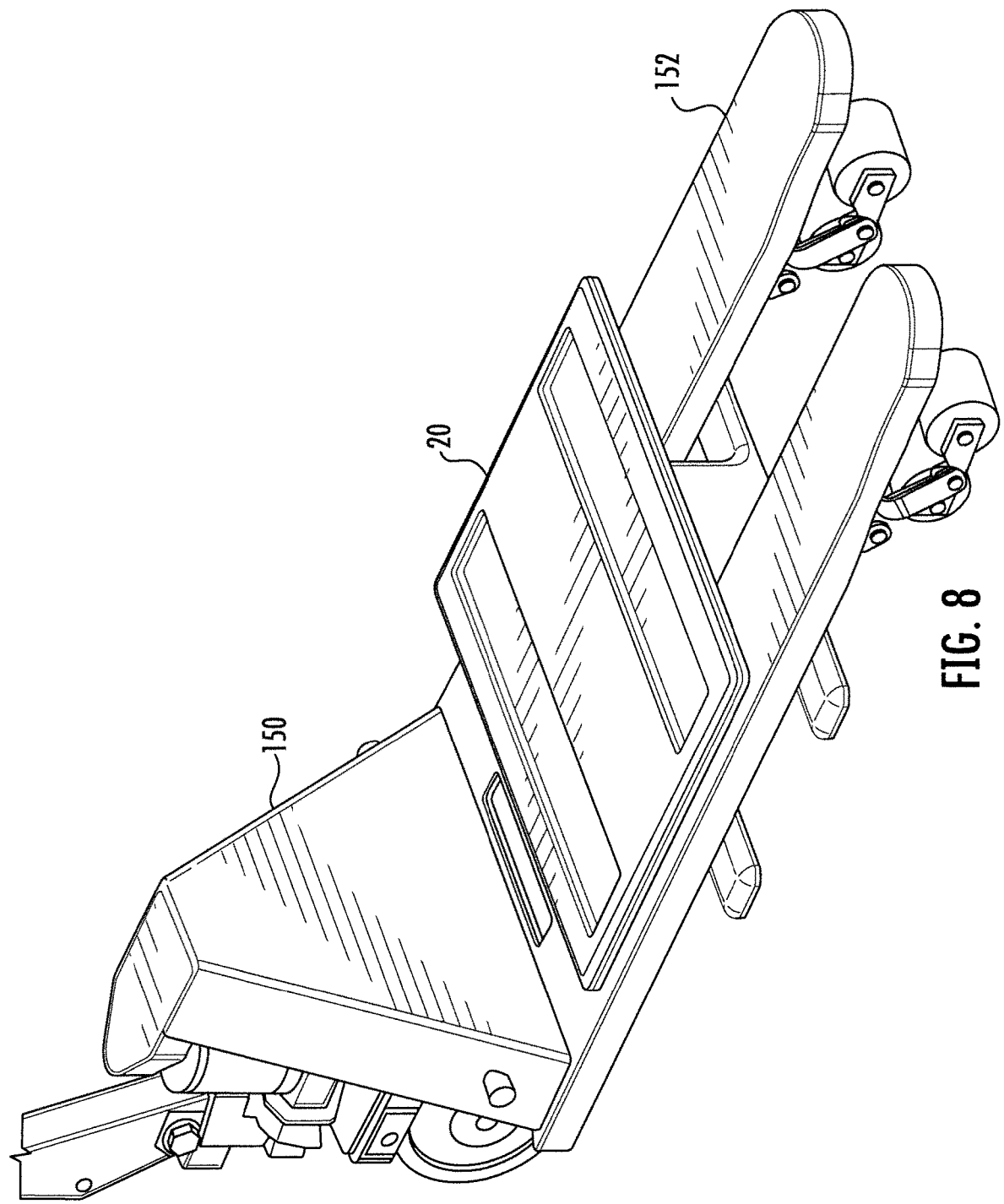

Each center leg section 42 is spaced from the sides 36, 38 of the top deck 30. This advantageously allows four way entry with pallet handling equipment 150, as illustrated in FIGS. 7 and 8. The illustrated pallet jack 150, for example, may be used to lift the fraction plastic pallet 20 from any of the four sides of the pallet. The pallet support legs 40 are sized and positioned on the underside 34 of the top deck 30 so that tines 152 with a spacing of 21 inches or 27 inches is supported.

Each pallet support leg 40 has a length within a range of 75% to 95% of the length of the top deck 30, and a width within a range of 10% to 20% of a width of the top deck 30. The overall length and width of the pallet support legs 40 provide stability for the pallet 20. Also, a length of each center leg section is within a range of 30% to 40% of an overall length of each pallet support leg 40.

As noted above, the fractional plastic pallet 20 may be sized such that the top deck 30 has a length of 24 inches and a width of 20 inches. An example length of the pallet support legs 40 may be 20.4 inches and an example width of each pallet support leg 40 may be 2.95 inches. An example length of the center leg section 42 may be 5.28 inches.

Figure 9:
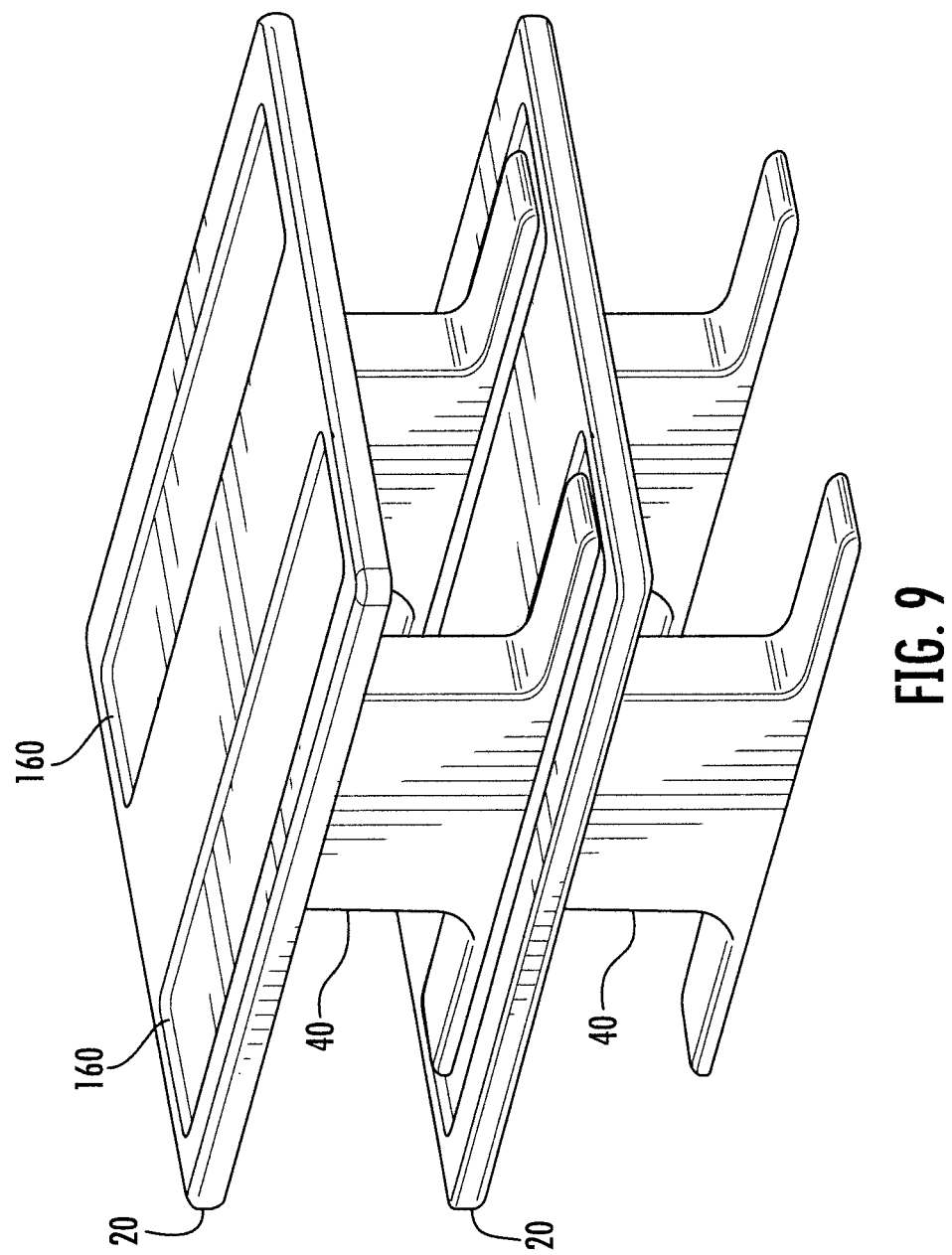
FIG. 9 is a perspective view of the fractional plastic pallet shown in FIG. 1 stacked with another fractional plastic pallet.
Figure 10:
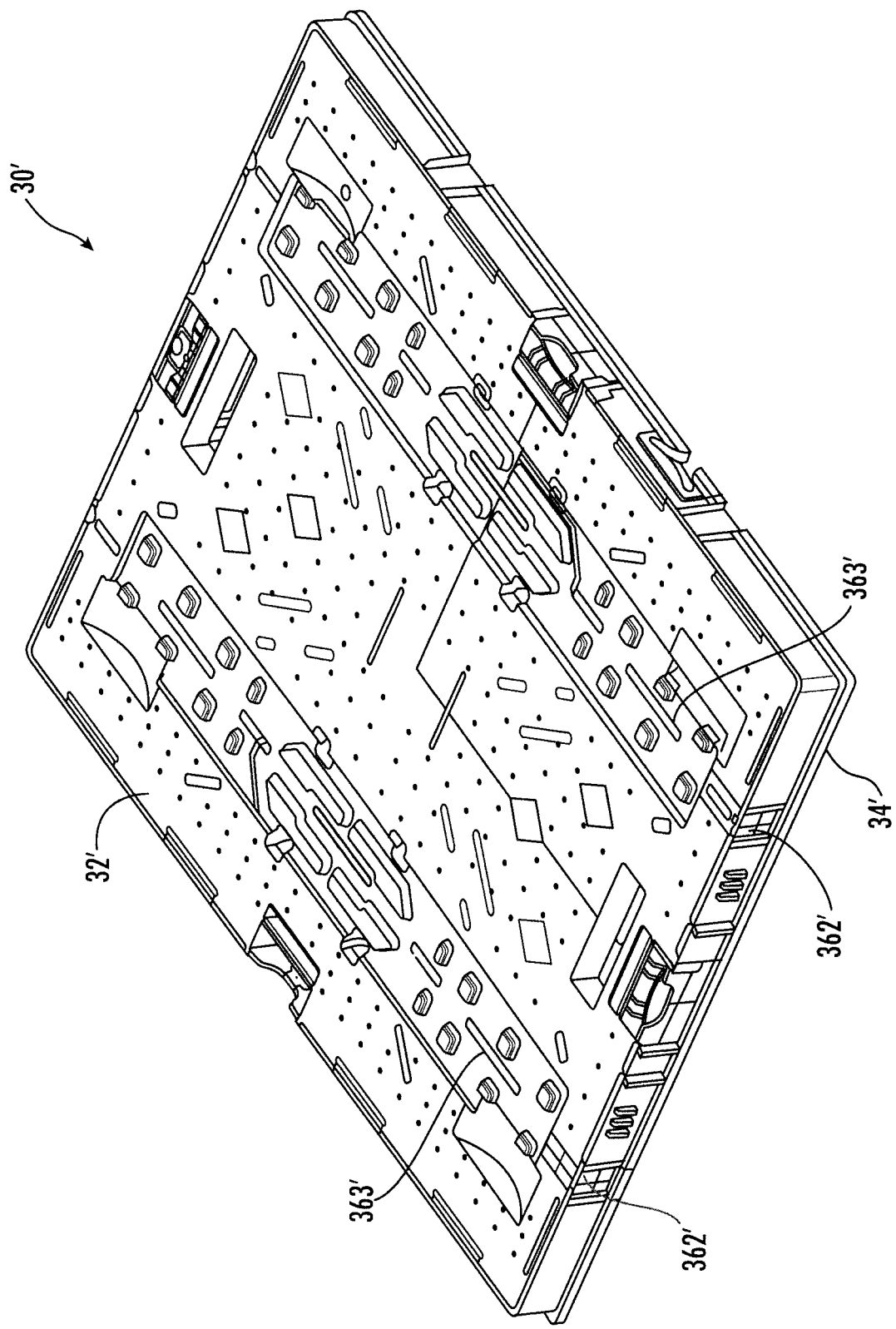
FIG. 10 is an upper perspective view of a reconfigurable pallet/dolly platform in accordance with the disclosure.

In addition, the fractional plastic pallet 20 is stackable with other fractional plastic pallets 20, as illustrated in FIG. 9. The lower surface or underside of each pallet support leg 40 is configured to engage or interlock with a pallet support leg receiving area 160 on the top deck 32 of another fractional plastic pallet 20 when stacked thereon.

More particularly, the pallet 20 includes a top deck 30 that includes a product support surface 32 and an opposing underside 34, and with the product support surface 32 including a pair of pallet support leg receiving areas 160. A pair of pallet support legs 40 is on the underside of the top deck 30 and is aligned with the pallet support leg receiving areas 160. By having the pallet support legs 40 engaging or interlocking with the pallet support leg receiving areas 160 stability is provided as stacked fractional plastic pallets 20 are moved.

The illustrated pallet support leg receiving areas 160 are recessed within the product support surface 32 of the top deck 30, as illustrated in FIG. 2. Each pallet support leg receiving area 160 is sized slight larger than the lowermost surface 170 of a pallet support leg 40. In addition, a grid pattern of spaced apart square protrusions 162 is provided within the pallet support leg receiving area 160, as also shown in FIG. 2.

The grid pattern of spaced apart square protrusions 162 is for engaging a corresponding grid pattern of spaced apart square protrusion openings 172 on the underside 170 of each pallet support leg 40, as shown in FIG. 3. The fractional plastic pallet 20 is not limited to the illustrated grid pattern and other configurations for engaging the underside 170 of the pallet supports legs 40 to the pallet support leg receiving areas 160 may be used, as readily appreciated by those skilled in the art.

Another feature of the fractional plastic pallet 20 is directed to shrink wrap gripping members 180 used with the application and retention of shrink wrap over a product being carried by the top deck 30. Shrink wrap is commonly used to secure a product to a pallet. This is often an alternative to banding, although both can be applied if desired.

A problem encountered in applying shrink wrap to a pallet is in securing the ends of the shrink wrap. This problem is encountered both at the start and the finish of shrink wrapping since the wrap might not want to adhere to the product or the pallet, or may fail to retain itself against the product of the pallet at the end.

Figure 4:
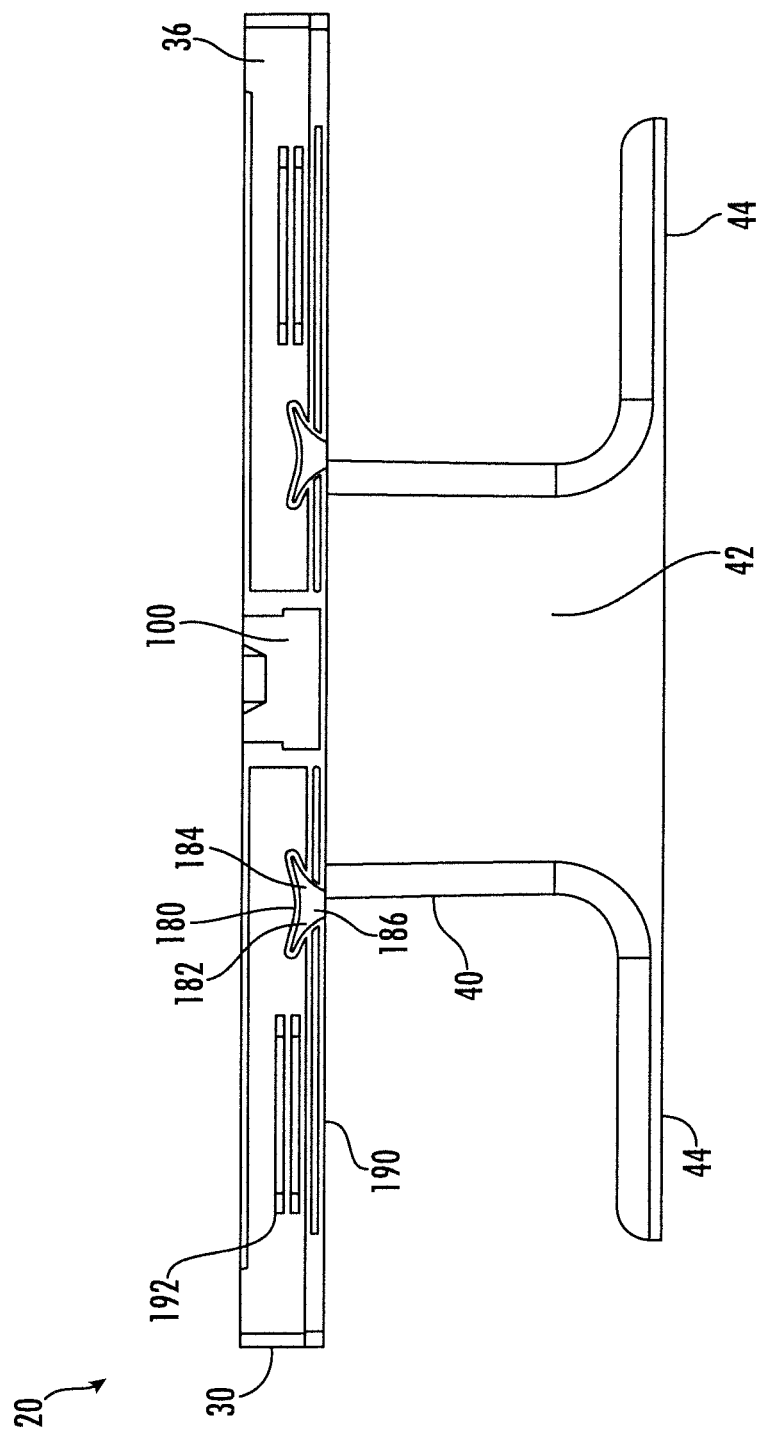
FIG. 4 is a side view of the fractional plastic pallet shown in FIG. 1.
Figure 5:
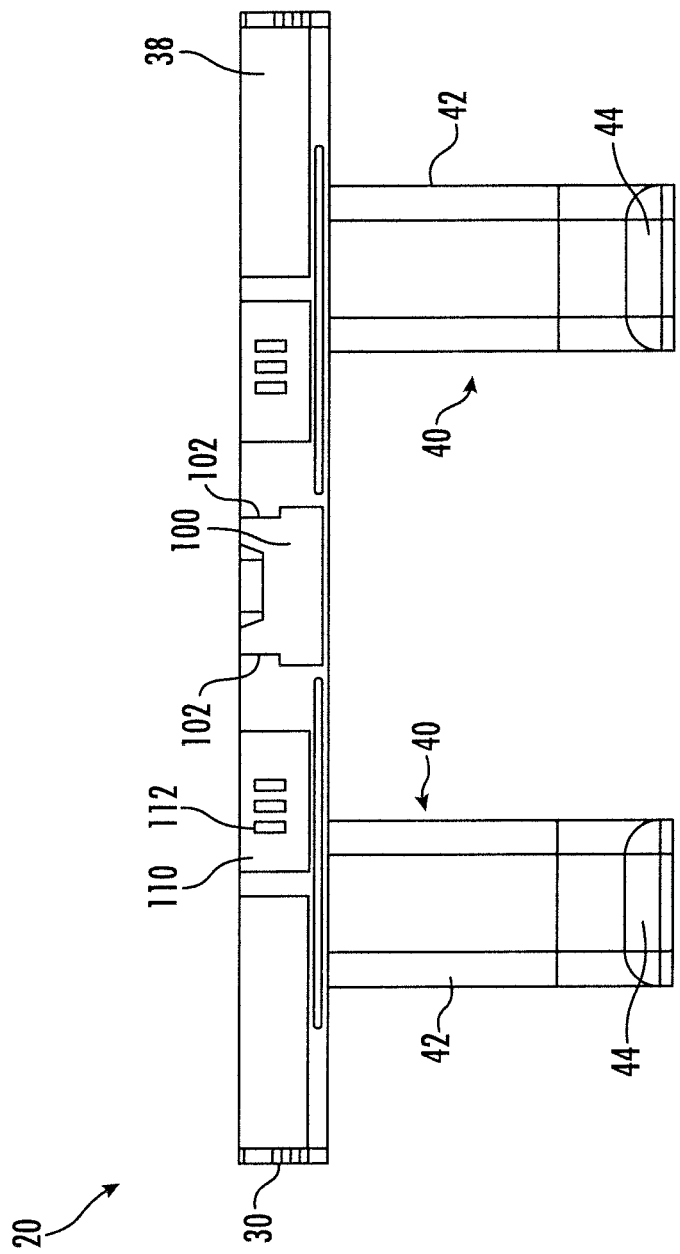
FIG. 5 is an end view of the fractional plastic pallet shown in FIG. 1.

Referring now to FIG. 4, the illustrated shrink wrap gripping members 180 are positioned along the sides 36 of the top deck 30. There are two shrink wrap gripping members 180 on each side 36.

The shrink wrap gripping members 180 take the form of a two-sided groove, similar to the shape of an anvil. The two-sided groove has a front recess 182 and a rear recess 184 and a narrowed opening 186. The narrowed opening 186 allows the shrink wrap to be located into the groove, but makes it harder for it to come out again. The wrap can be pulled into either the front or rear recesses 182, 184, and can secure an end of the wrap either at the start or at the end of the wrapping process.

The bottom edge of the top deck 30 includes grooves 190 for use as a banding strap locator, as illustrated in FIG. 3. Above the grooves 190 are side reinforcements 192 for additional stiffness to the sides 36, as illustrated in FIG. 4. The side reinforcements 192 assist with supporting a load on the top deck 30 that might cause flexing of the top deck in the area above the end sections 44 of the pallet support legs 40.

The top deck 30 includes a hand access hole 60. In the illustrated embodiment the hand access hole 60 is located at or towards the center of gravity of the fractional plastic pallet 20, or at or near the center of the product support surface 32. In other embodiments, there may be a pair of hand access holes 60. The pair of hand access holes 60 may be centered within the top deck 30. Alternatively, the hand access hole 60 is optional such that in other embodiments of the top deck 30 a hand access hole will not be included.

The hand access hole 60 provides an easy means for an operator to handle the fractional plastic pallet 20. The hand access hole 60 is sized large enough for a user to insert all four fingers of his hand therethrough. By providing the central hand access hole 60 towards the center of the fractional plastic pallet 20, or at or near the balance point of the fractional plastic pallet 20, the pallet 20 can very easily be grasped by the user for carrying it or for unloading it from a stack of pallets.

Finger grip details can be provided on one or both long sides of the hand access hole 60. A rounded end wall may be provided at one or both short ends thereof. A rounding of the finger grips or ends of the hand access hole 60 offers a smother engagement surface to the user. This also can make the fractional plastic pallet 20 more comfortable when being lifted.

The top deck 30 is formed using ribbing grids 200, as illustrated in FIG. 3. The ribbing grids 200 advantageously allow the fractional plastic pallet 20 to have a high strength/load capacity. The ribbing grids 200 of the fractional plastic pallet 20 may be configured to handle loads up to 500 pounds, for example.

In addition, the product support surface 32 of the top deck 30 includes an array of frictional points 31 to prevent slippage of products on the product support surface 32. Each frictional point 31 has a circular shape and is in the form of a raised stub, for example.

The fractional plastic pallet 20 also includes a ridge 39 that extends along the corners of the pallet. The ridge 39 is at the lower edge of sides 36, 38. The corners are configured so that they are recessed from the ridge 39, as shown in FIGS. 1 and 2.

A method for making the above illustrated pallet 20 includes forming a top deck 30 that includes a product support surface 32 and an opposing underside 34, and with the product support surface 32 including a pair of pallet support leg receiving areas 160.

The method further includes forming a pair of pallet support legs 40. Each pallet support leg 40 includes a center leg section 42 and a pair of leg extensions 44. The center leg section 42 has a first end and a second end opposite the first end. The pair of leg extensions 44 extend outwards from the second end of the center leg section 42. An underside of the center leg section 42 and the pair of leg extensions 44 is configured to engage one of the pallet support leg receiving areas 160 of an identical pallet when stacked thereon.

The method further includes coupling the first ends of the center leg sections 42 of the pair of pallet support legs 40 to the underside of the top deck 30. Each pallet support leg 40 is aligned with a corresponding pallet support leg receiving area 160 in the top deck 30.

Figure 11:
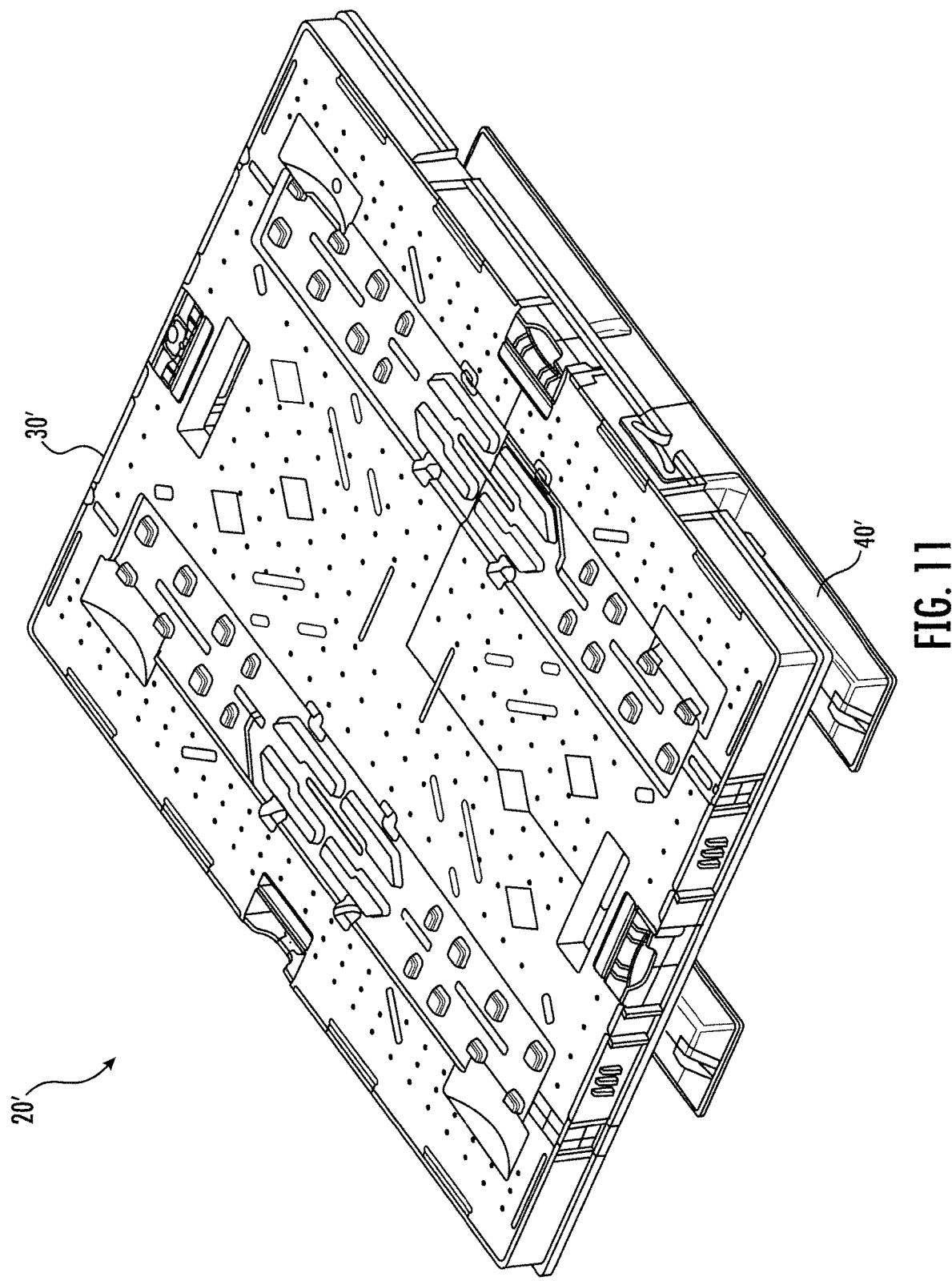
FIG. 11 is a top perspective view of the reconfigurable pallet/dolly platform shown in FIG. 10 configured as a pallet.
Figure 12:
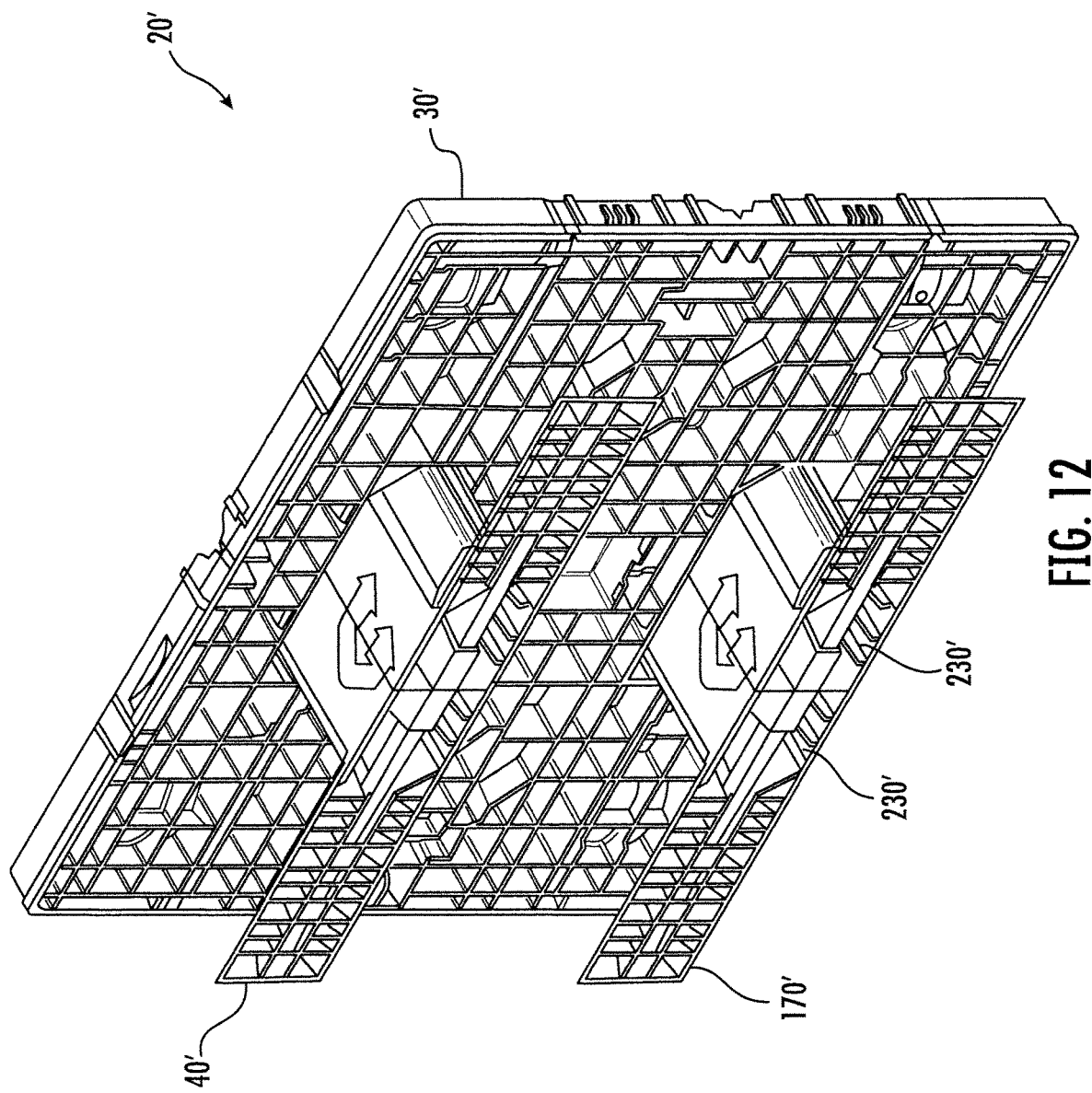
FIG. 12 is a bottom perspective view of the reconfigurable pallet/dolly platform shown in FIG. 10 configured as a pallet.
Figure 13:
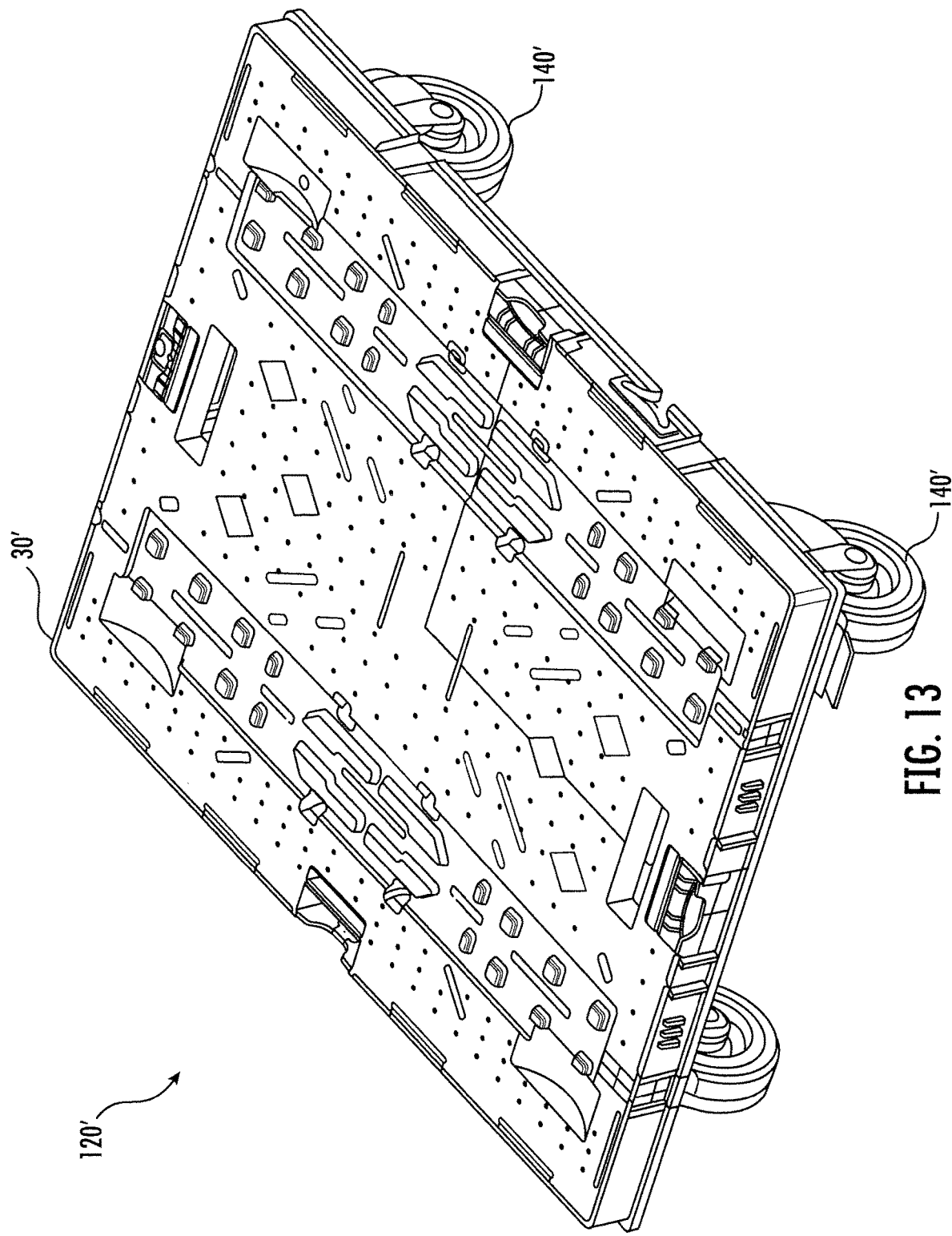
FIG. 13 is a top perspective view of the reconfigurable pallet/dolly platform shown in FIG. 10 configured as a dolly.
Figure 14:
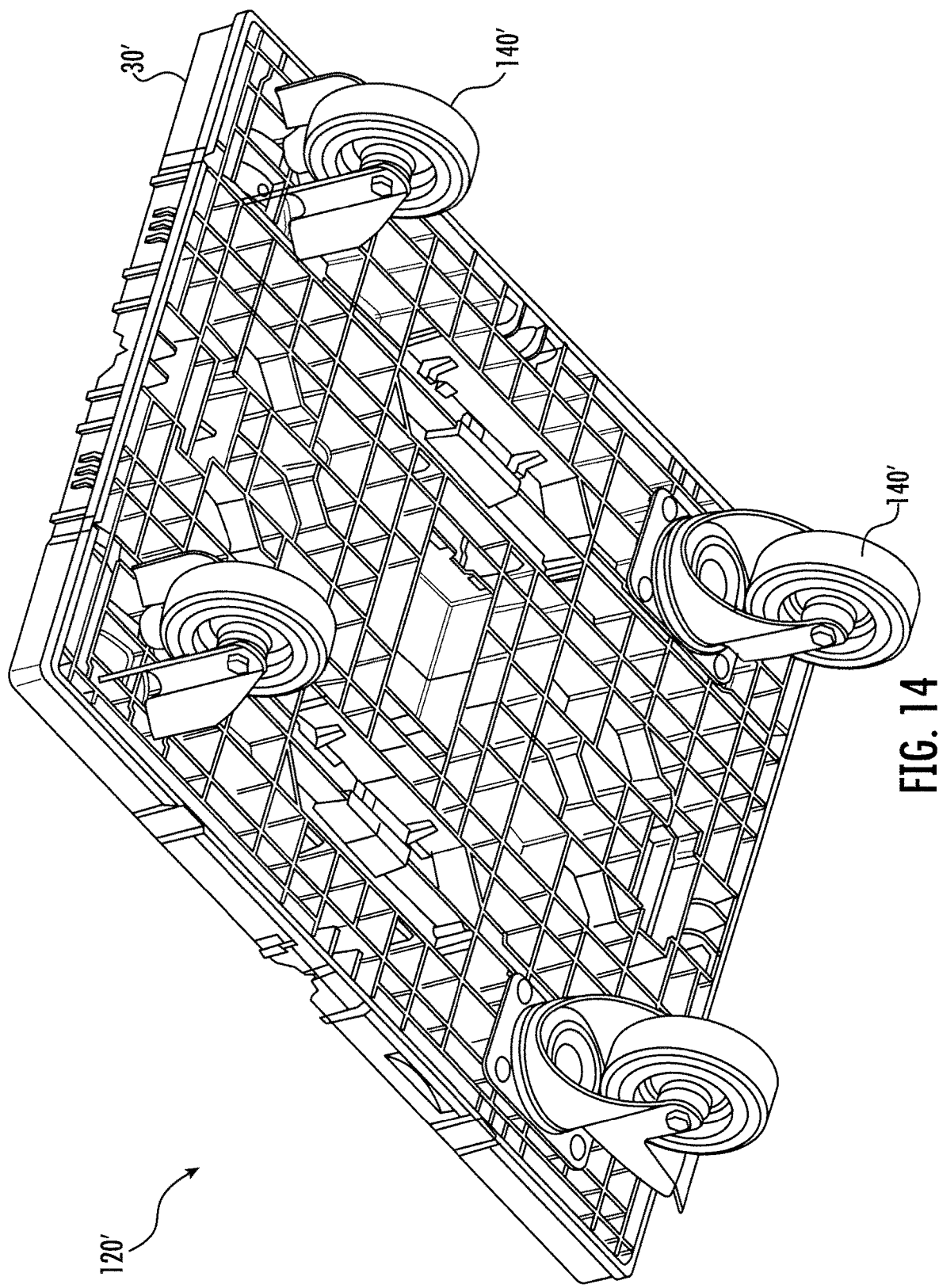
FIG. 14 is a bottom perspective view of the reconfigurable pallet/dolly platform shown in FIG. 10 configured as a dolly.

Referring now to FIGS. 10-20, another embodiment is directed to a reconfigurable pallet/dolly platform. The reconfigurable pallet/dolly platform includes a top deck 30' that may be configured with pallet support legs 40' to form a pallet 20' as illustrated in FIGS. 11 and 12, or may be configured with dolly wheels 140' to form a dolly 120' as illustrated in FIGS. 13-14.

Figure 15:
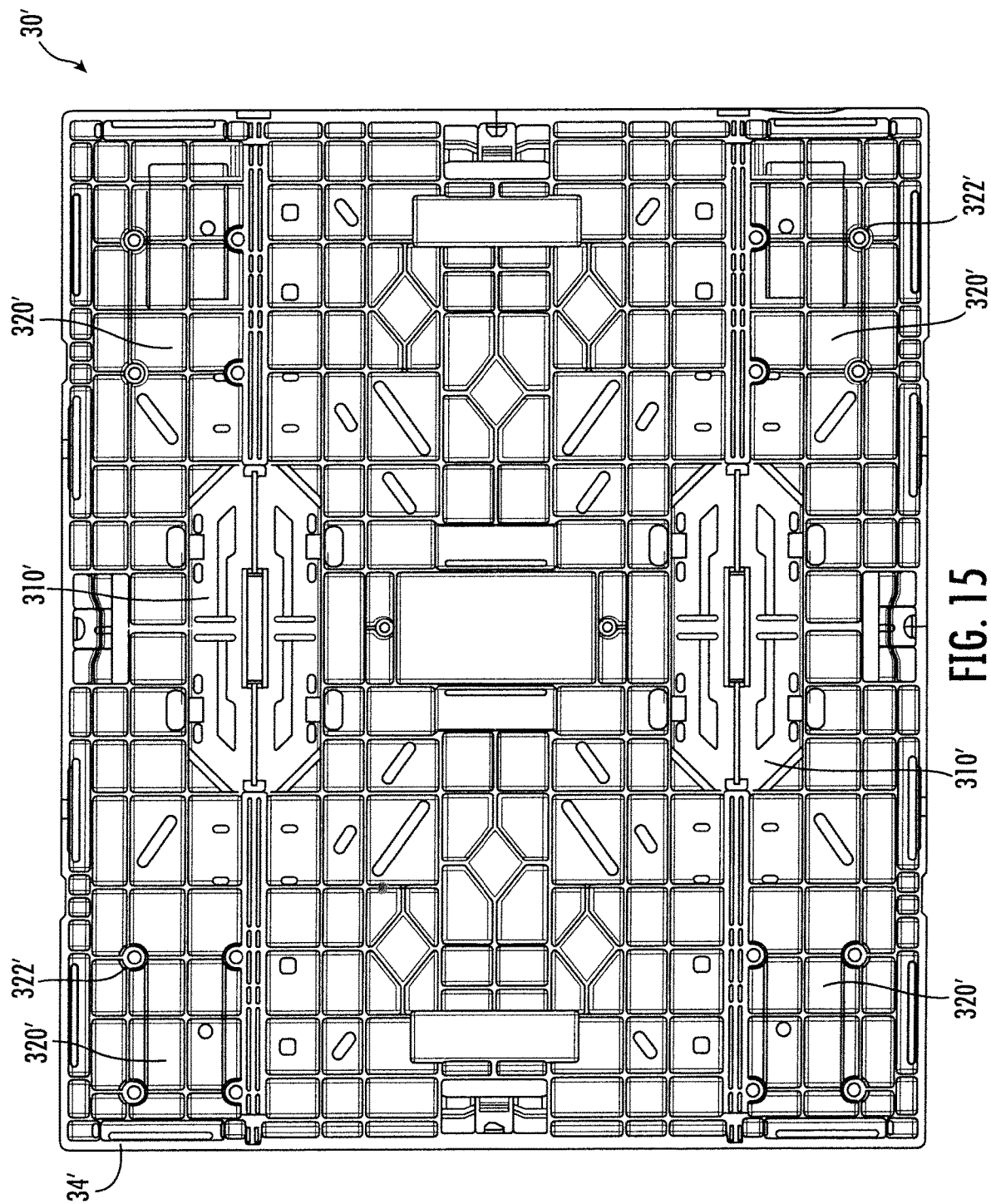
FIG. 15 is a bottom view of the reconfigurable pallet/dolly platform shown in FIG. 10.

The top deck 30' is advantageously reconfigured to support either configuration. The top deck 30' includes a product support surface 32' and an opposing underside 34'. As illustrated in FIG. 15, the underside 34' includes a pair of pallet support leg attachment areas 310' for receiving a pair of pallet support legs 40' when configured as a pallet 520'. The underside 34' further includes a plurality of dolly wheel attachment areas 320' for receiving a plurality of dolly wheels 140' when configured as a dolly 120'.

Figure 16:
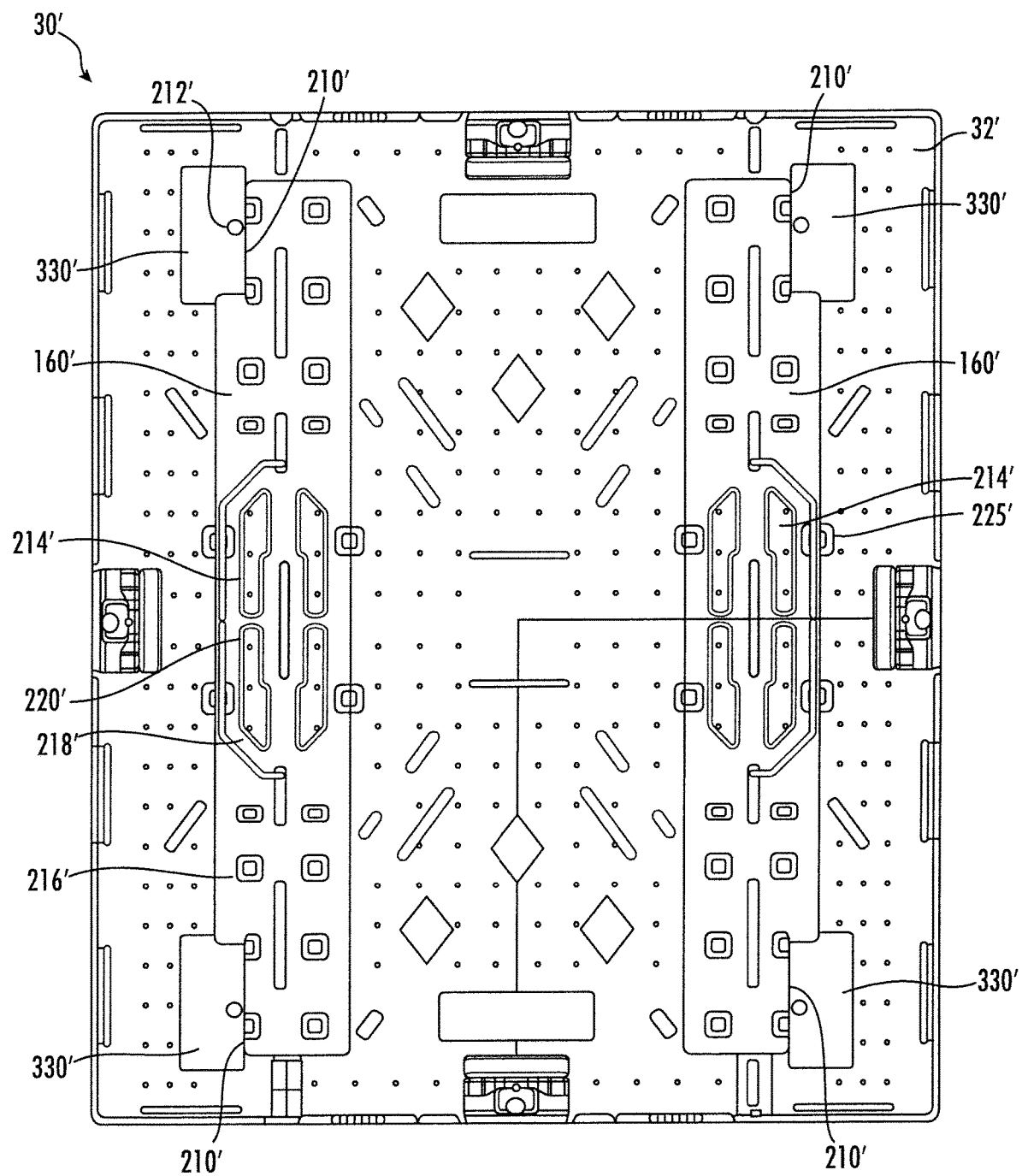
FIG. 16 is top view of the reconfigurable pallet/dolly platform shown in FIG. 10.

As illustrated in FIG. 16, the product support surface 32' includes a pair of pallet support leg receiving areas 160' aligned with the pair of pallet support leg attachment areas 310' and configured to engage the pair of pallet support legs 40' from an identical platform stacked thereon when configured as a pallet 20'. The product support surface 32' further includes a plurality of dolly wheel receiving areas (i.e., dolly wheel wells) 330' aligned with the plurality of dolly wheel attachment areas 320' and configured to engage the plurality of dolly wheels 140' from an identical platform stacked thereon when configured as a dolly 120'. Each dolly wheel attachment area 320' includes four attachment points 322' for securing a dolly wheel 140'.

There are four dolly wheel wells 330' in the product support surface 32', one for each dolly wheel 140'. Each dolly wheel well 330' is adjacent to a pallet support leg receiving area 160'. By having the dolly wheel wells 330' receiving the dolly wheels 140' from a stacked dolly 120', stability is provided as the stacked dollies 120' are moved.

In particular, each dolly wheel well 330' overlaps a corner portion 210' of the pallet support leg receiving area 160'. The corner portion 210' of the pallet support leg receiving area 160' is recessed to complete the outline of the dolly wheel well 330'.

There are two dolly wheel wells 330' adjacent each pallet support leg receiving area 160'. In addition, each dolly wheel well 330' includes a drainage opening 212' so that water or other liquids do not accumulate within the dolly wheel wells 330'. The dolly wheels 140' at one end of the dolly 120' can swivel about an axis perpendicular to the top deck 30', whereas the dolly wheels 140' at the other end of the dolly 120' do not swivel. Alternatively, all the dolly wheels 140' can swivel.

The pallet support leg receiving areas 160' are recessed within the product support surface 32' of the top deck 30'. Each pallet support leg receiving area 160' is sized slight larger than the lowermost surface 170' of a pallet support leg 40'. By having the pallet support leg receiving areas 160' receive pallet support legs 40' from a stacked pallet 20', stability is provided as the stacked pallets 20' are moved.

Each pallet support leg receiving area 160' includes a pattern of spaced apart protrusions matching a corresponding pattern of spaced apart protrusion openings in an underside 170' of each pallet support leg 40'. The spaced apart protrusions include four rectangular-shaped protrusions 214' in the center of the pallet support leg receiving area 160' as illustrated in FIG. 16. The spaced apart protrusions further include a plurality of smaller square-shaped protrusions 216' on each side of the four rectangular-shaped protrusions 214' within the pallet support leg receiving area 160'.

One end 218' of each rectangular-shaped protrusion 214' is angled or sloped. The other end 220' of each rectangular-shaped protrusion 214' is not angled or sloped and includes a portion removed so that the other end 220' is narrower than end 218'. The four rectangular-shaped protrusions 214' are for engaging a corresponding pattern of four rectangular-shaped protrusion openings 230' on the underside 170' of each pallet support leg 40' as illustrated in FIG. 15.

Adjacent the four rectangular-shaped protrusions 214' are four access openings 225' to permit a tool to be used to separate a pallet support leg 40' when engaged with the pallet support leg receiving area 160'. The access openings 225' are along an edge of the pallet support leg receiving areas 160'. The access openings 225' also extend into the product support surface 32' of the top deck 30'. The access openings 225' also extend through the top deck 30' so as to prevent water or other liquids from accumulating within the pallet support leg receiving areas 160'.

Figure 17:
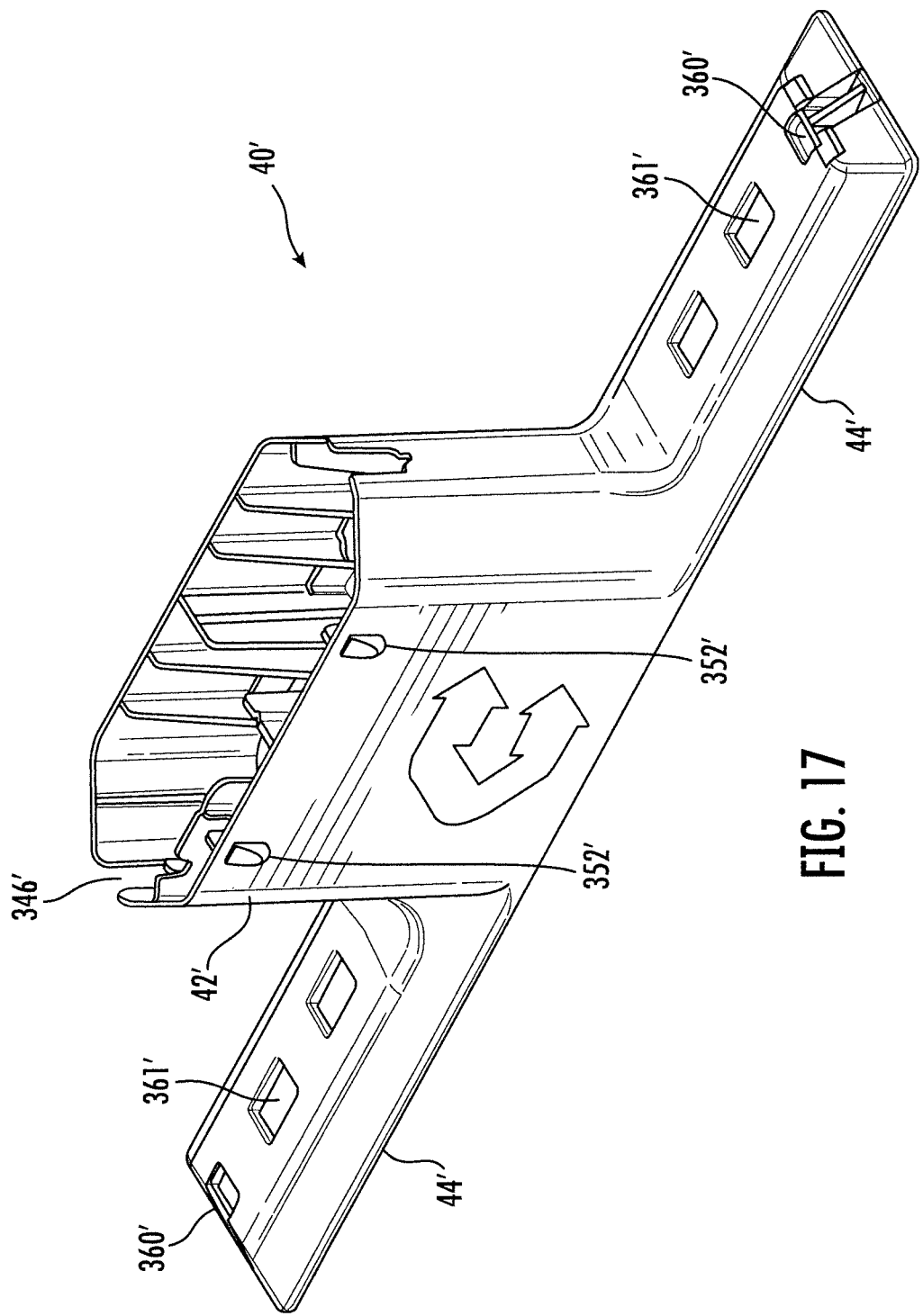
FIG. 17 is a perspective view of one of the pallet support legs as shown in FIGS. 11-12.

Each pallet support leg 40' includes a center leg section 42 and a pair of leg extensions 44', as illustrated in FIG. 17. The center leg section 42' has a first end and a second end opposite the first end. The pair of leg extensions 44' extend outwards from the second end of the center leg section 42'.

Figure 18:
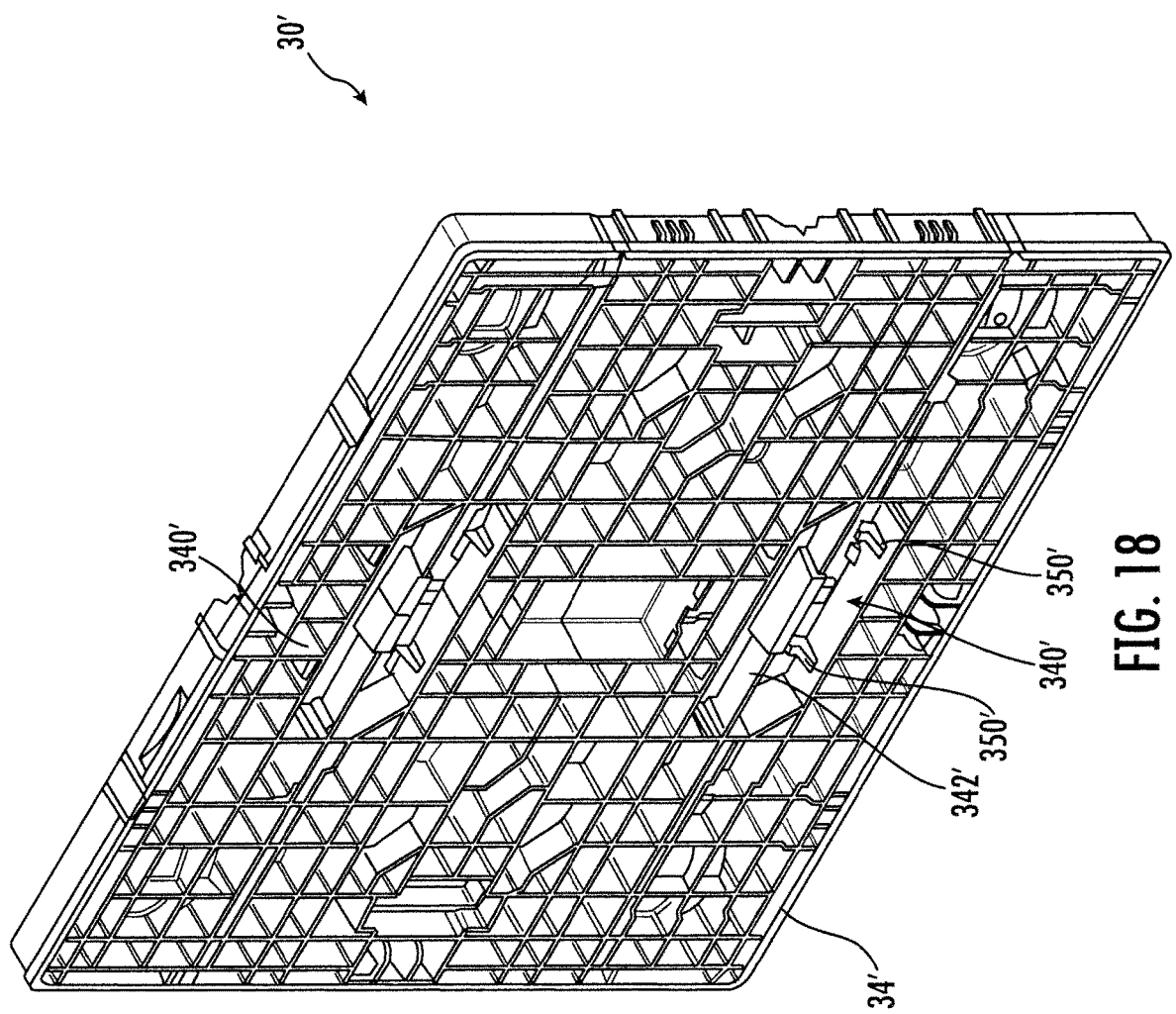
FIG. 18 is a bottom perspective view of the reconfigurable pallet/dolly platform shown in FIG. 10.

The underside 34' of the top deck 30' includes a pair of center leg section openings 340', as illustrated in FIG. 18. Each center leg section opening 340' is to receive the first end of one of the center leg sections 42' when configured as a pallet 20'.

Each center leg section opening 340' is separated by a divider 342', and wherein the first end of each center leg section 42' is slotted 346' to receive the divider 342'. Also, each center leg section opening 340' includes a plurality of locking tab openings 350' for engaging a plurality of locking tabs 352' on one of the center leg sections 42'.

Each pallet support leg 40' includes a reinforcement member 361' that extends through each leg extension 44' and the center leg section 42. Openings within the leg extensions 44' exposes the reinforcement member 361'. The reinforcement member 361' may be steel, for example. A respective clip 360' is coupled to each leg extension 44' to enclose an exposed end of the reinforcement member 361'.

The top deck 30' also includes a pair of reinforcement members 363' that extends from one side of the top deck 30' to the other side. Openings within the top deck 30' exposes the reinforcement members 363'. The reinforcement members 361' may be steel, for example. Clips 362' are coupled to the top deck 30' to enclose exposed ends of the reinforcement member 363'.

Each pallet support leg receiving area 160' has a length within a range of 75% to 95% of the length of the top deck 30', and a width within a range of 10% to 20% of a width of the top deck 30'. Also, a length of each center leg section opening 350' is within a range of 30% to 40% of an overall length of each pallet support leg receiving area 160'.

A method for making the above illustrated pallet reconfigurable pallet/dolly platform includes forming a top deck 30' that includes a product support surface 32' and an opposing underside 34'.

The underside 34' includes a pair of pallet support leg attachment areas 310' for receiving a pair of pallet support legs 40' when configured as a pallet 20'. The underside 34' also includes a plurality of dolly wheel attachment areas 320' for receiving a plurality of dolly wheels 140' when configured as a dolly 120'.

Figure 19:
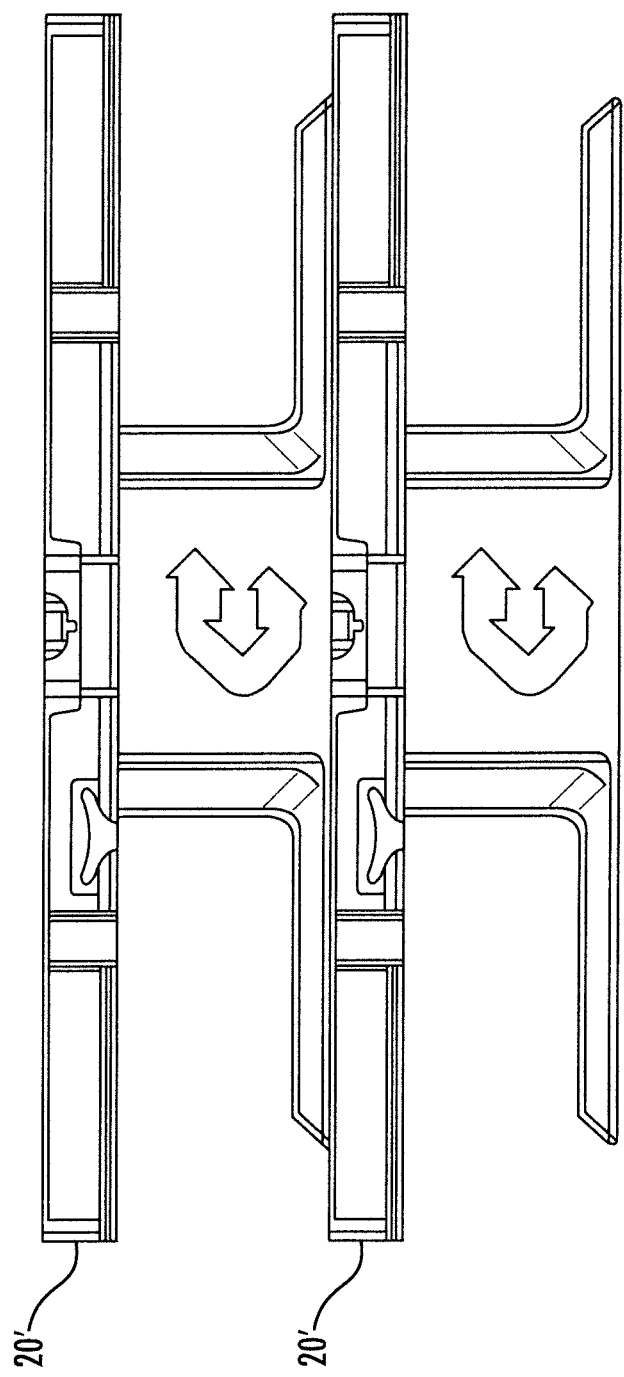
FIG. 19 is a side view of the pallet shown in FIGS. 11-12 stacked with another pallet.

The product support surface 32' includes a pair of pallet support leg receiving areas 160' aligned with the pair of pallet support leg attachment areas 310' and configured to engage the pair of pallet support legs 40' from an identical platform stacked thereon when configured as a pallet 20' as illustrated in FIG. 19.

Figure 20:
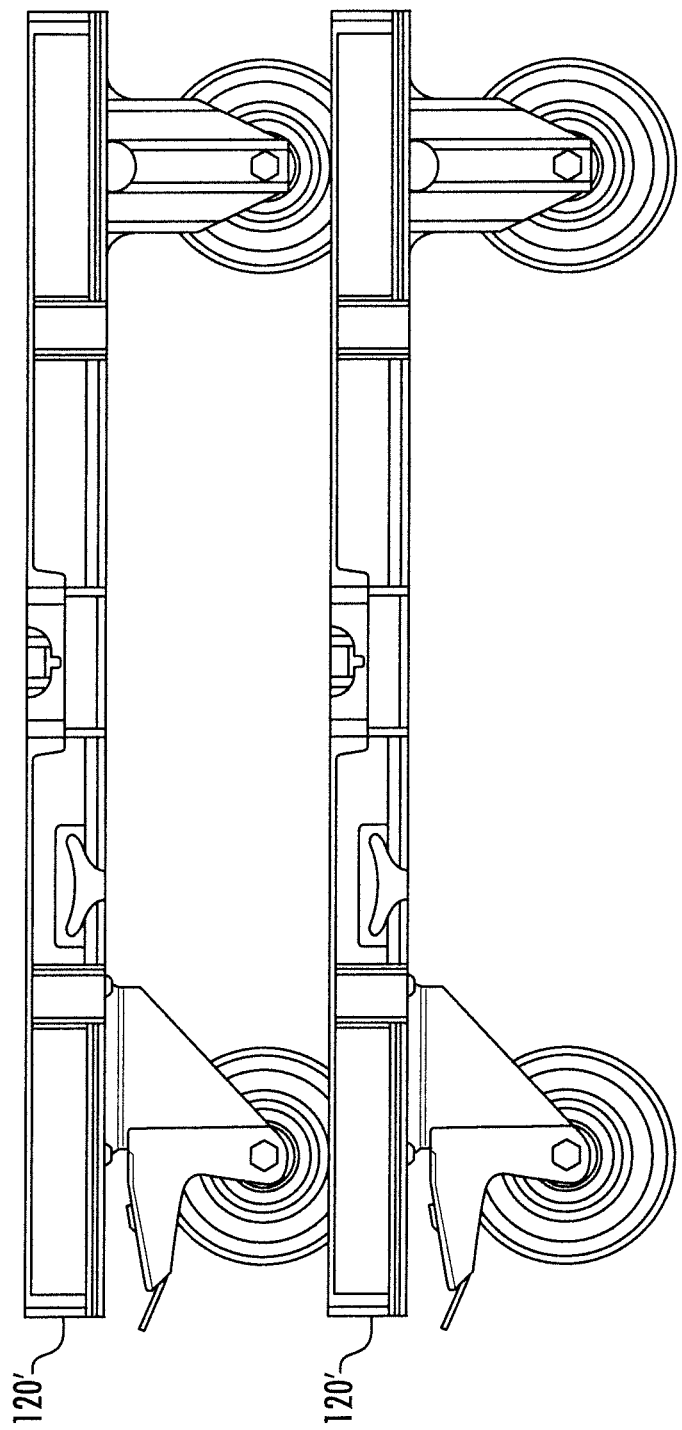
FIG. 20 is a side view of the dolly shown in FIGS. 13-14 stacked with another dolly.

The product support surface 32' also includes a plurality of dolly wheel receiving areas 320' aligned with the plurality of dolly wheel attachment areas 320' and configured to engage the plurality of dolly wheels 140' from an identical platform stacked thereon when configured as a dolly as illustrated in FIG. 20.

The top deck 30, 30' may be configured with provisions to enable attachment of an electronic tracking device. A compartment, for example, may be formed or attached to an underside of the top deck 30, 30' to carry the electronic tracking device. Fasteners may be used for the attachment, including screws or other hardware, plastic clips, or a combination thereof. The electronic tracking device may be configured to store data during pallet use. The electronic tracking device may include, but is not limited to, communication protocols such as Bluetooth, Bluetooth Low Energy (BLE), RFID, cellular, and GPS.

The top deck 30, 30' may be configured to include channels or openings for receiving reinforcing members. The reinforcing members improve the overall performance and strength of the top deck 30, 30'. The reinforcing members may be formed with various materials, including but not limited to steel and other metals.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the foregoing description.

The invention claimed is:

1. A reconfigurable pallet/dolly platform comprising:
    a top deck including a product support surface and an opposing underside;
    with the underside including:
        a pair of pallet support leg attachment areas for receiving a pair of pallet support legs when configured as a pallet, and
        a plurality of dolly wheel attachment areas for receiving a plurality of dolly wheels when configured as a dolly; and
    with the product support surface including:
        a pair of pallet support leg receiving areas aligned with the pair of pallet support leg attachment areas and configured to engage the pair of pallet support legs from an identical platform stacked thereon when configured as a pallet, with each pallet support leg receiving area contoured to match a footprint of a corresponding pallet support leg,
        a plurality of dolly wheel receiving areas aligned with the plurality of dolly wheel attachment areas and configured to engage the plurality of dolly wheels from an identical platform stacked thereon when configured as a dolly, and
        with each dolly wheel receiving area partially overlapping the contour of one of the pallet support leg receiving areas.

2. The reconfigurable pallet/dolly platform according to claim 1 wherein each pallet support leg receiving area is rectangular shaped, and wherein each dolly wheel receiving area overlaps an outside corner of one of the pallet support leg receiving areas.

3. The reconfigurable pallet/dolly platform according to claim 1 wherein each pallet support leg receiving area and each dolly wheel receiving area are recessed from the product support surface.

4. The reconfigurable pallet/dolly platform according to claim 1 wherein each pallet support leg receiving area includes a pattern of spaced apart protrusions matching a corresponding pattern of spaced apart protrusion openings in an underside of each pallet support leg.

5. The reconfigurable pallet/dolly platform according to claim 1 wherein each pallet support leg includes a center leg section having a first end and a second end opposite the first end, and a pair of leg extensions extending outwards from the second end of the center leg section, and wherein the underside of said top deck includes a pair of center leg section openings, with each center leg section opening to receive the first end of one of the center leg sections when configured as a pallet.

6. The reconfigurable pallet/dolly platform according to claim 5 wherein each center leg section opening is separated by a divider, and wherein the first end of each center leg section is slotted to receive the divider.

7. The reconfigurable pallet/dolly platform according to claim 5 wherein each center leg section opening includes a plurality of locking tab openings for engaging a plurality of locking tabs on one of the center leg sections.

8. The reconfigurable pallet/dolly platform according to claim 5 wherein a length of each center leg section opening is within a range of 30% to 40% of an overall length of each pallet support leg receiving area.

9. The reconfigurable pallet/dolly platform according to claim 1 wherein each pallet support leg receiving area has a length within a range of 75% to 95% of a length of said top deck, and a width within a range of 10% to 20% of a width of said top deck.

10. The reconfigurable pallet/dolly platform according to claim 1 wherein said top deck has a length of 24 inches and a width of 20 inches.

11. The reconfigurable pallet/dolly platform according to claim 1 wherein when said top deck is configured as a pallet, the plurality of dolly wheel attachment areas do not receive the plurality of dolly wheels.

12. The reconfigurable pallet/dolly platform according to claim 1 wherein when said top deck is configured as a dolly, the pair of pallet support leg attachment areas do not receive the pair of pallet support legs.

13. A method for making a reconfigurable pallet/dolly platform comprising:
forming a top deck including a product support surface and an opposing underside;
with the underside including:
a pair of pallet support leg attachment areas for receiving a pair of pallet support legs when configured as a pallet, and
a plurality of dolly wheel attachment areas for receiving a plurality of dolly wheels when configured as a dolly; and
with the product support surface including:
a pair of pallet support leg receiving areas aligned with the pair of pallet support leg attachment areas and configured to engage the pair of pallet support legs from an identical platform stacked thereon when configured as a pallet, with each pallet support leg receiving area contoured to match a footprint of a corresponding pallet support leg,
a plurality of dolly wheel receiving areas aligned with the plurality of dolly wheel attachment areas and configured to engage the plurality of dolly wheels from an identical platform stacked thereon when configured as a dolly, and
with each dolly wheel receiving area partially overlapping the contour of one of the pallet support leg receiving areas.

14. The method according to claim 13 wherein each pallet support leg receiving area is rectangular shaped, and wherein each dolly wheel receiving area overlaps an outside corner of one of the pallet support leg receiving areas.

15. The method according to claim 13 wherein each pallet support leg receiving area and each dolly wheel receiving area are recessed from the product support surface.

16. The method according to claim 13 wherein each pallet support leg receiving area includes a pattern of spaced apart protrusions matching a corresponding pattern of spaced apart protrusion openings in an underside of each pallet support leg.

17. The method according to claim 13 wherein each pallet support leg includes a center leg section having a first end and a second end opposite the first end, and a pair of leg extensions extending outwards from the second end of the center leg section, and wherein the underside of the top deck includes a pair of center leg section openings, with each center leg section opening to receive the first end of one of the center leg sections when configured as a pallet.

18. The method according to claim 13 wherein each pallet support leg receiving area has a length within a range of 75% to 95% of a length of the top deck, and a width within a range of 10% to 20% of a width of the top deck.

19. The method according to claim 13 wherein when the top deck is configured as a pallet, the plurality of dolly wheel attachment areas do not receive the plurality of dolly wheels.

20. The method according to claim 13 wherein when the top deck is configured as a dolly, the pair of pallet support leg attachment areas do not receive the pair of pallet support legs.

* * * * *